(12) United States Patent
Tamura et al.

(10) Patent No.: US 7,171,104 B2
(45) Date of Patent: Jan. 30, 2007

(54) OPTICAL WAVEGUIDE PLATE FOR SURFACE LIGHT EMITTING APPARATUS AND SURFACE LIGHT EMITTING APPARATUS USING THE OPTICAL WAVEGUIDE PLATE

(75) Inventors: Yuuki Tamura, Anan (JP); Eiji Nakanishi, Anan (JP)

(73) Assignee: Nichia Corporation, Anan (JP)

( * ) Notice: Subject to any disclaimer, the term of this patent is extended or adjusted under 35 U.S.C. 154(b) by 83 days.

(21) Appl. No.: 10/677,835

(22) Filed: Oct. 3, 2003

(65) Prior Publication Data

US 2004/0071437 A1    Apr. 15, 2004

(30) Foreign Application Priority Data

Oct. 4, 2002    (JP) .............................. 2002-292294
Aug. 1, 2003    (JP) .............................. 2003-285382

(51) Int. Cl.
G02B 6/10    (2006.01)

(52) U.S. Cl. ....................................... 385/146; 385/901

(58) Field of Classification Search ................. 385/36, 385/39, 146, 147, 901; 362/608, 610, 339
See application file for complete search history.

(56) References Cited

U.S. PATENT DOCUMENTS 5,477,239 A * 12/1995 Busch et al. ................. 345/102

6,601,962 B1    8/2003 Ehara et al.

FOREIGN PATENT DOCUMENTS

| JP | 8-271886 A | 10/1996 |
|---|---|---|
| JP | 10-199316 A | 7/1998 |
| JP | 10-247411 A | 9/1998 |
| JP | 10-293202 A | 11/1998 |
| JP | 2000-30520 A | 1/2000 |
| JP | 2000-306411 A | 11/2000 |
| JP | 2001-28203 A | 1/2001 |
| JP | 2001-118415 A | 4/2001 |
| JP | 2001-236811 A | 8/2001 |
| JP | 2002-42534 A | 2/2002 |
| JP | 2002-196151 A | 7/2002 |

* cited by examiner

*Primary Examiner*—Sarah Song
(74) *Attorney, Agent, or Firm*—Smith Patent Office

(57) ABSTRACT

An optical waveguide plate for a surface light emitting apparatus and a surface light emitting apparatus using the optical waveguide plate that provides excellent uniformity in surface emission is disclosed. The optical waveguide plate comprises an end face introducing light emitted from a light source, and a light emitting surface outputting light introduced from the end face. The end face has a light introducing portion comprising a plurality of notched prisms which disperse incident light. The intervals between two adjacent prisms are set to become greater in proportion to the distance from the center of the light introducing portion. The angles of the prisms are also adjusted to provide uniform surface emission.

21 Claims, 12 Drawing Sheets

P100

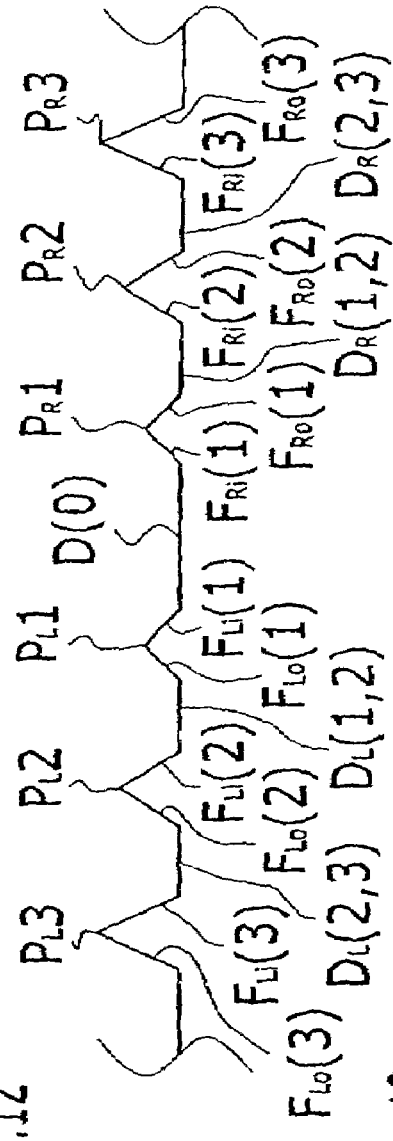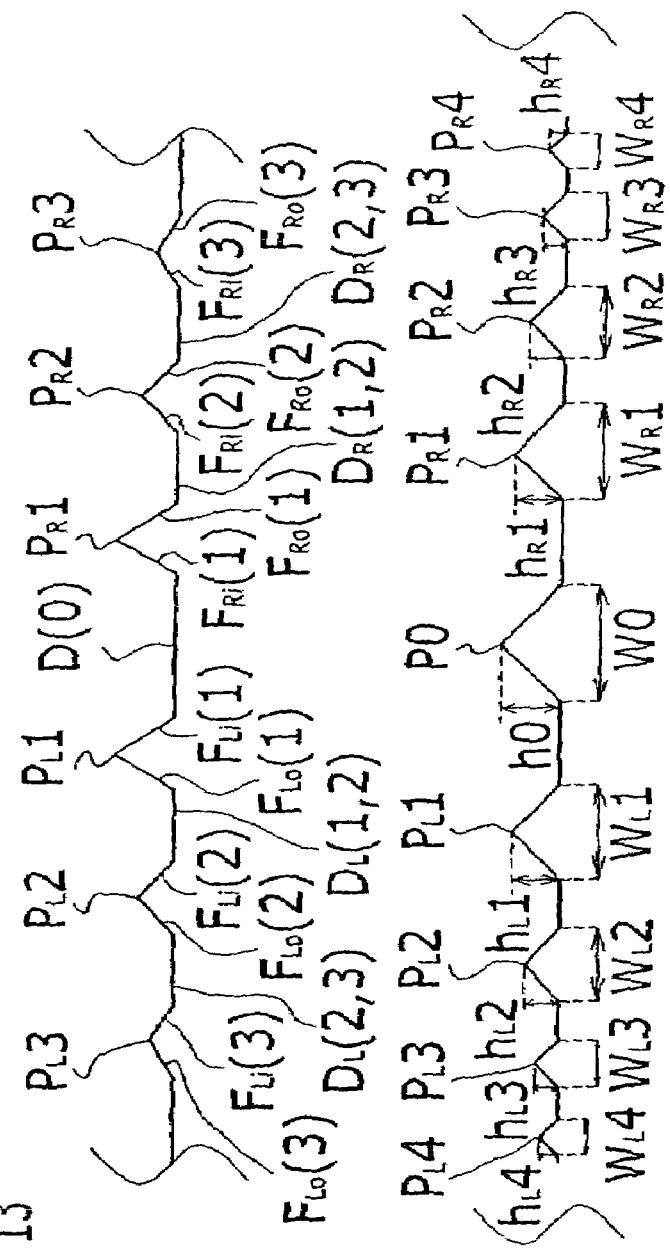
Fig.12
Fig.13
Fig.14

OPTICAL WAVEGUIDE PLATE FOR SURFACE LIGHT EMITTING APPARATUS AND SURFACE LIGHT EMITTING APPARATUS USING THE OPTICAL WAVEGUIDE PLATE

BACKGROUND OF THE INVENTION

1. Field of the Invention

The present invention relates to an optical waveguide plate for a surface light emitting apparatus and a surface light emitting apparatus using the optical waveguide plate for a backlight of a liquid crystal display, a panel meter, an indicator light, a surface emitting optical switch, and the like.

2. Description of the Related Art

A surface light emitting apparatus has recently been used as the light source for a backlight of a liquid crystal display and the like. The apparatus outputs light emitted from a point source such as an LED element by spreading the light over a plane. In such a surface light emitting apparatus, light emitted by a light emitting diode enters through an incident end face of an optical waveguide plate and exits through the entire area of the light emitting surface thereof. Uniform emission from its light emitting surface is crucial in such a light emitting apparatus. A variety of structures have been proposed for achieving uniformity in emission. For example, Japanese Unexamined Patent Publication No. 2002-42534 discloses such an apparatus.

A surface light emitting apparatus disclosed in Japanese Unexamined Patent Publication No. 2002-42534 has a light guide. This reference describes that in a light emitting apparatus that emits light from a first main surface of a light guide, the light guide comprises a plurality of notches having different shapes from each other on an end face opposite the emission surface of the light source. Each of the notches includes a first face and a second face. The angle made by the first face and an end face decreases as the distance from a center of the end face increases. Also, the angle made by the second face and an end face increases as the distance from the center of the end face increases.

SUMMARY OF THE INVENTION

As the surface light emitting apparatus has found widespread use, more uniformity in surface light emission has been demanded.

Thus, an object of the present invention is to provide an optical waveguide plate having an improved uniformity in surface light emission for a surface light emitting apparatus and a surface light emitting apparatus using the improved optical waveguide plate.

An optical waveguide plate for a surface light emitting apparatus according to the present invention comprises an end face for introducing light emitted from a light source and a light emitting surface outputting light introduced from the end face. The end face includes a light introducing portion comprising a plurality of single notched prisms which disperse incident light. The basic composition described above is repeated in the present specification for sake of clarity. An interval between two adjacent distal notched prisms is different from an interval between two adjacent proximal notched prisms in the light introducing portion.

Also, in the optical waveguide plate for a surface light emitting apparatus according to the present invention, it is preferable that the interval of the two adjacent distal notched prisms is greater than the interval between the two adjacent proximal notched prisms.

In optical waveguide plate for a surface light emitting apparatus according to the present invention has the construction described above, the incident light can be effectively dispersed by reducing the rate of reflection of incident light. The incident light is introduced from the outer incident face of a proximal notched prism and is reflected by the inner incident face of an adjacent distal notched prism.

Further, the notched prisms in the optical waveguide plate for the surface light emitting apparatus are triangular prisms or triangular pyramid prisms in the end face.

Also, the plurality of notched prisms includes a central notched prism disposed in a center of the light introducing portion in the optical waveguide plate. The plurality of notched prisms also include an outer incident face on a side further from the central notched prism and an inner incident face on a side closer to the central notched prism. In order to disperse incident light more efficiently, it is preferable to construct each of the single notched prisms, other than the central notched prism, so that the angle made by the outer incident face and the end face decreases as the distance from the central notched prism increases, and the angle made by the inner incident face and the end face increases as the distance from the central notched prism increases.

In addition, the light introducing portion can include a central flat portion between two adjacent notches across from the emission center of a light source. Each of the notched prisms comprises an outer incident face and an inner incident face. The outer incident face is on the side further from the flat portion and the inner incident face is on the side closer to the flat portion. Further, the angle made by the outer incident face and the end face decreases as the distance from the flat portion increases, and the angle made by the inner incident face and the end face increases as the distance from the flat portion increases.

In the optical waveguide plate for a surface emitting apparatus of the present invention described above, a flat portion is positioned across from the center of emission of a light source. This allows incident light emitted from the light source to be distributed more uniformly in the direction of the optical axis and in the direction approximately perpendicular to the optical axis of the light source (i.e. in the width direction of the optical waveguide plate).

Further, in the optical waveguide plate according to the present invention, each of the single notched prisms other than the central notched prism, disposed in the center of the light introducing portion, comprises an outer incident face on a side further from the central notched prism and an inner incident face on a side closer to the central notched prism. Also, the apex angle made by the outer incident face and the inner incident face decreases as the distance from the central notched prism increases.

In the optical waveguide plate for a surface light emitting apparatus of the present invention described above, the angle made by the outer incident face and the inner incident face of a notched prism decreases as the distance from the center of the light introducing portion increases so that the light introduced to the optical waveguide plate will be refracted toward a line normal to the outer incident face. Thus, the portion of incident light dispersed in the width direction of the optical waveguide plate can be increased.

Also, in the optical waveguide plate for a surface emitting apparatus according to the present invention, the plurality of notched prisms other than the central notched prism disposed in a center of the light introducing portion comprises the outer incident face on a side further from the central notched prism and the inner incident face on a side closer to the central notched prism. Further, the apex angle made by the outer incident face and the inner incident face increases as the distance from the central notched prism increases.

In the optical waveguide plate for a surface emitting apparatus of the present invention as described above, the angle made by the outer incident face and the inner incident face increases as the distance from the center of the light introducing portion increases. According to this construction, the height of the notched prisms, other than the central notched prism, decreases as the distance from the central notched prism increases. Thus, an incident light can travel in the width direction of the optical waveguide plate without being interrupted, and better light dispersion in the width direction can be obtained.

Further, in the light introducing portion of the optical waveguide plate of the present invention, the flat portion between two adjacent notched prisms disposed across from the emission center. Each of the plurality of notched prisms comprises an outer incident face on a side further from the flat portion and an inner incident face on a side closer to the flat portion. Further, the apex angle made by the outer incident face and the inner incident face decreases as the distance from the central notched prism increases.

In the optical waveguide plate for the surface emitting apparatus according to the present invention as described above, the light source perpendicular to the light introducing portion can be sufficiently guided through along its axis to the tip portion of the optical waveguide plate. This allows a better light dispersion in the width direction of the optical waveguide plate to be obtained.

Also, in the light introducing portion of the optical waveguide plate of the present invention, a flat portion can be disposed between the two adjacent notched prisms. Each of the plurality of notched prisms comprises an outer incident face on a side further from the flat portion and an inner incident face on a side closer to the flat portion. Also, the apex angle formed by the outer incident face and the inner incident face of a notched prism increases as the distance from the flat portion increases.

In this optical waveguide plate, incident light perpendicular to the light introducing portion can be sufficiently guided through along its axis to the tip portion of the optical waveguide plate. Also, incident light guided in the width direction of the optical waveguide plate by the notched prisms formed closer to the light source can be dispersed without being interrupted by the notched prisms formed further from the light source.

Further, the optical waveguide plate of the present invention can comprise a light emitting surface and an end face including a light introducing portion having a plurality of notched prisms including a central notched prism disposed in a center of the light introducing portion. In each of the plurality of notched prisms, including the central notched prism, each include an apex angle, and each of the notched prisms has the same apex angle as the central notched prism. Also, the height of the plurality of notched prisms decreases as the distance from the central notched prism increases.

In this optical waveguide plate the incident light such as light which is introduced from the central notched prism and is guided in the width direction of the optical waveguide plate will not be interrupted by the other notched prisms. Therefore, incident light can be dispersed through previously shadowy portions.

Also, in the optical waveguide plate according to another embodiment of the present invention the plurality of notched prisms, including the central notched prism, each include an apex angle, and each of the notched prisms has the same apex angle as the central notched prism. Also, the height of each of the notched prisms other than the central notched prism increases as the distance from the central notched prism increases.

In this optical waveguide plate, an amount of incident light introduced from the outer incident faces of the notched prisms located further from the central notched prism will be increased, and thus the incident light can be dispersed over a wide area.

Further, in the optical waveguide plate according to the present invention, the width of the central notched prism disposed in the center of the light introducing portion and the intervals between the central notched prism and the single notched prisms adjacent to the central notched prism are approximately equal in size.

In addition, in the optical waveguide plate according to the present invention, the width of the central notched prism disposed in the center of the light introducing portion is smaller than the intervals between the central notched prism and the single notched prisms adjacent to the center notched prism.

The optical waveguide plate for a surface emitting apparatus according to the present invention having a construction as described above allows more efficient uniform surface light emission.

Further, the optical waveguide plate according to another embodiment of the present invention comprises an end face for introducing light emitted from a light source and a light emitting surface for outputting the light through the light emitting surface. The end face includes a light introducing portion comprises a plurality of notched prisms which disperse incident light. The plurality of notched prisms other than the central notched prism each comprise an outer incident face on the side further from the central notched prism and an inner incident face which is the side closer to the central notched prism. Each of the notched prisms has an apex angle and the apex angle of each of the notched prisms is different than the apex angle of the central notched prism. The apex angle of each of the notched prisms is also different than the apex angle of the other notched prisms and can vary over a wide range of angles. Also, it is possible for the apex angle of each of the notched prisms on one side of the central notched prism equals the apex angle of a respective notched prism on another side of the central notched prism.

Each of the notched prisms other than the central notched prism disposed in a center of the light introducing portion comprises an outer incident face on a side further from the central notched prism and an inner incident face on a side closer to the central notched prism. It is preferable that an apex angle made by the outer incident face and the inner incident increases as the distance from the central notched prism increases. Therefore, an incident light such as light introduced from the central notched prism can be prevented from being reflected by the other notched prisms.

Further, the optical waveguide plate according to a further embodiment of the present invention comprises a light emitting surface for outputting the light through the light emitting surface and an end face for introducing light emitted from a light source. The end face includes a light introducing portion comprising a plurality of notched prisms which disperse incident light. A flat portion is the center of the light introducing portion. The apex angle of each notched prisms disposed in the one side of the flat portion is different than the apex angles of the other single notched prisms on the one side of the flat portion. Also, the apex angle of each of the notched prisms on one side of the flat portion equals the apex angle of a respective single notched prism on another side of the flat portion.

Especially in the light introducing portion, each of the plurality of notched prisms comprises an outer incident face on a side further from the flat portion and an inner incident face on a side closer to the flat portion. It is also possible for the apex angle made by the outer incident face and the inner incident face to increase as the distance from the flat portion increases. Therefore, an incident light can be dispersed not only in the direction perpendicular to the axis, but also a sufficient amount of light can be directed along its axis, so that a more uniform surface emission can be obtained.

Also, in the optical waveguide plate according to a still further embodiment of the present invention, light emitted from a light source is introduced to the end face and emitted from the light emitting surface. The end face includes a light introducing portion comprising a plurality of notched prisms including a central notched prism disposed in a center of the light introducing portion. The plurality of notched prisms including the central notched prism, each include an apex angle, and each of the notched prisms has the same apex angle as the central notched prism. Also, the height of the plurality of notched prisms decreases as the distance from the central notched prism increases. Therefore, an incident light guided in the lateral direction can be dispersed without being interrupted.

According to a further embodiment of the present invention, the optical waveguide plate comprises an end face for introducing light emitted from a light source and a light emitting surface for outputting light introduced from the end face. The end face includes a light introducing portion comprising a plurality of notched prisms which disperse incident light. A flat portion is disposed in the center of the light introducing portion. The plurality of notched prisms each includes an apex angle which is equal to the other apex angles.

The height of the plurality of notched prisms decreases as the distance from the flat portion increases. Therefore, an excellent surface light emission can be obtained by light traveling in the direction of the optical axis and light dispersed in the width direction of the optical waveguide plate.

Also, in the optical waveguide plate according to the present invention, the plurality of notched prisms are disposed in the light introducing portion and a portion of the end face is disposed between two adjacent notched prisms so as to form an interval therebetween. Therefore, more uniform surface emission can be obtained.

The surface light emitting apparatus according to further embodiment of the present invention comprises a light source and a optical waveguide plate including an end face and a light emitting surface. The light emitted from the light source is introduced to the end face and emitted through the light emitting surface of the optical waveguide plate. The end face has a light introducing portion that comprises of a plurality of notched prisms which disperses incident light. An interval between the two adjacent distal notched prisms in the light introducing portion is different from an interval between the two adjacent proximal notched prisms in the light introducing portion.

Also, in the surface light emitting apparatus, it is preferable to arrange the interval between the two adjacent distal notched prisms is greater than the interval between the two adjacent proximal notched prisms. Therefore, incident light can be dispersed efficiently in the surface light emitting apparatus having the construction described above and more uniform surface emission can be obtained.

In addition, in the surface light emitting apparatus of the present invention, the notched prisms can also be triangular prisms or triangular pyramids in the end face.

In the surface light emitting apparatus according to the present invention, the plurality of notched prisms includes a central notched prism disposed in a center of the light introducing portion in the optical waveguide plate. The plurality of notched prisms also include an outer incident face on a side further from the central notched prism and an inner incident face on a side closer to the central notched prism. In order to disperse incident light more efficiently, it is preferable to construct each of the single notched prisms, other than the central prism, so that the angle made by the outer incident face and the end face decreases as the distance from the central notched prism increases, and the angle made by the inner incident face and the end face increases as the distance from the central notched prism increases.

Furthermore, it is preferable that the light source is a light emitting diode.

It is also possible to use any of the optical waveguide plate discussed above in the surface light emitting apparatus according to the present invention.

The surface light emitting apparatus according to a further embodiment of the present invention comprises a light source and an optical waveguide plate including an end face for introducing light emitting surface. The light emitted from the light source is introduced to the end face and emitted through the light emitting surface of the optical waveguide plate. The end face has a light introducing portion that comprises of a plurality of notched prisms which disperses incident light. Each of the notched prisms has an apex angle and the apex angle of each of the notched prisms is different than the apex angle of the central notched prism.

Further, the surface light emitting apparatus according to yet a further embodiment of the present invention comprises a light source and an optical waveguide plate including an end face and a light emitting surface. The light emitted from the light source is introduced to the end face and emitted through the light emitting surface of the optical waveguide plate. The end face has a light introducing portion that comprises of a plurality of notched prisms which disperses incident light. Each of the notched prisms has an apex angle and the apex angles of each of the notched prisms disposed on the one side of the central flat portion are different than the apex angles of the other single notched prisms on the same side of the flat portion.

Also, the surface light emitting apparatus according to a still further embodiment of the present invention comprises a light source and a optical waveguide plate including an end face and a light emitting surface. The light emitted from the light source is introduced to the end face and emitted through the light emitting surface of the optical waveguide plate. The end face has a light introducing portion that comprises of a plurality of notched prisms which disperses incident light. The plurality of notched prisms include the central notched prism, each include an apex angle and each of the notched prisms has the same apex angle as the central notched prism.

According to a further embodiment of the present invention, the surface light emitting apparatus comprises a light source and a optical waveguide plate including an end face and a light emitting surface. The light emitted from the light source is introduced to the end face and emitted through the light emitting surface of the optical waveguide plate. The end face has a light introducing portion that comprises a plurality of notched prisms which disperse incident light. The flat portion is disposed in a center of the light introducing portion. The plurality of notched prisms each include an apex angle which is equal to the other apex angles.

BRIEF DESCRIPTION OF THE DRAWINGS

FIG. 12 is a schematic plan view showing the detailed light introducing portion of still another embodiment according to the present invention.

FIG. 13 is a schematic plan view showing the detailed light introducing portion of additional embodiment according to the present invention.

FIG. 14 is a schematic plan view showing the detailed light introducing portion of a further embodiment according to the present invention.

DETAILED DESCRIPTION OF THE PREFERRED EMBODIMENTS

Figure 1:
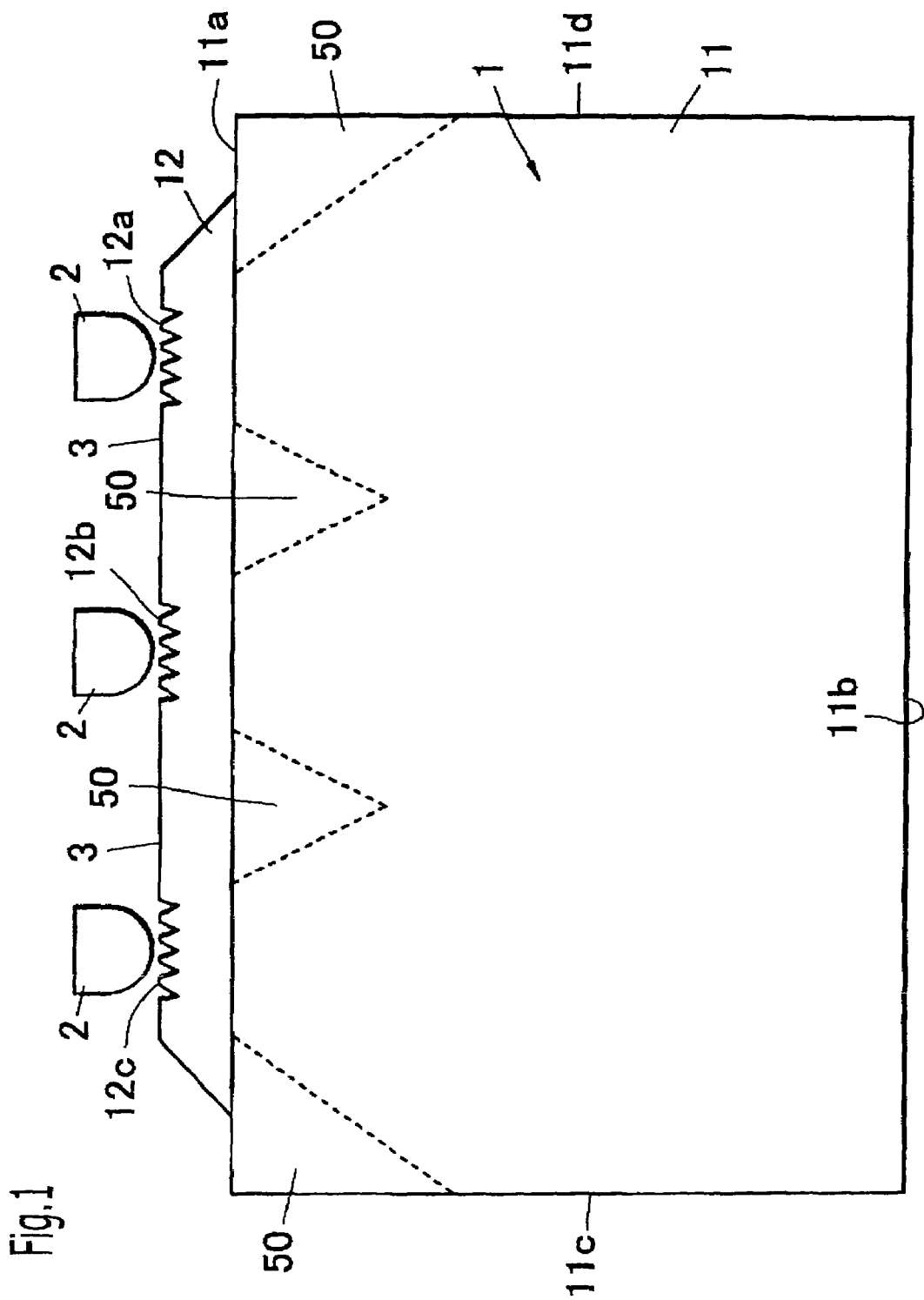
FIG. 1 is a schematic plan view showing a surface light emitting apparatus of an embodiment according to the present invention.
Figure 2:
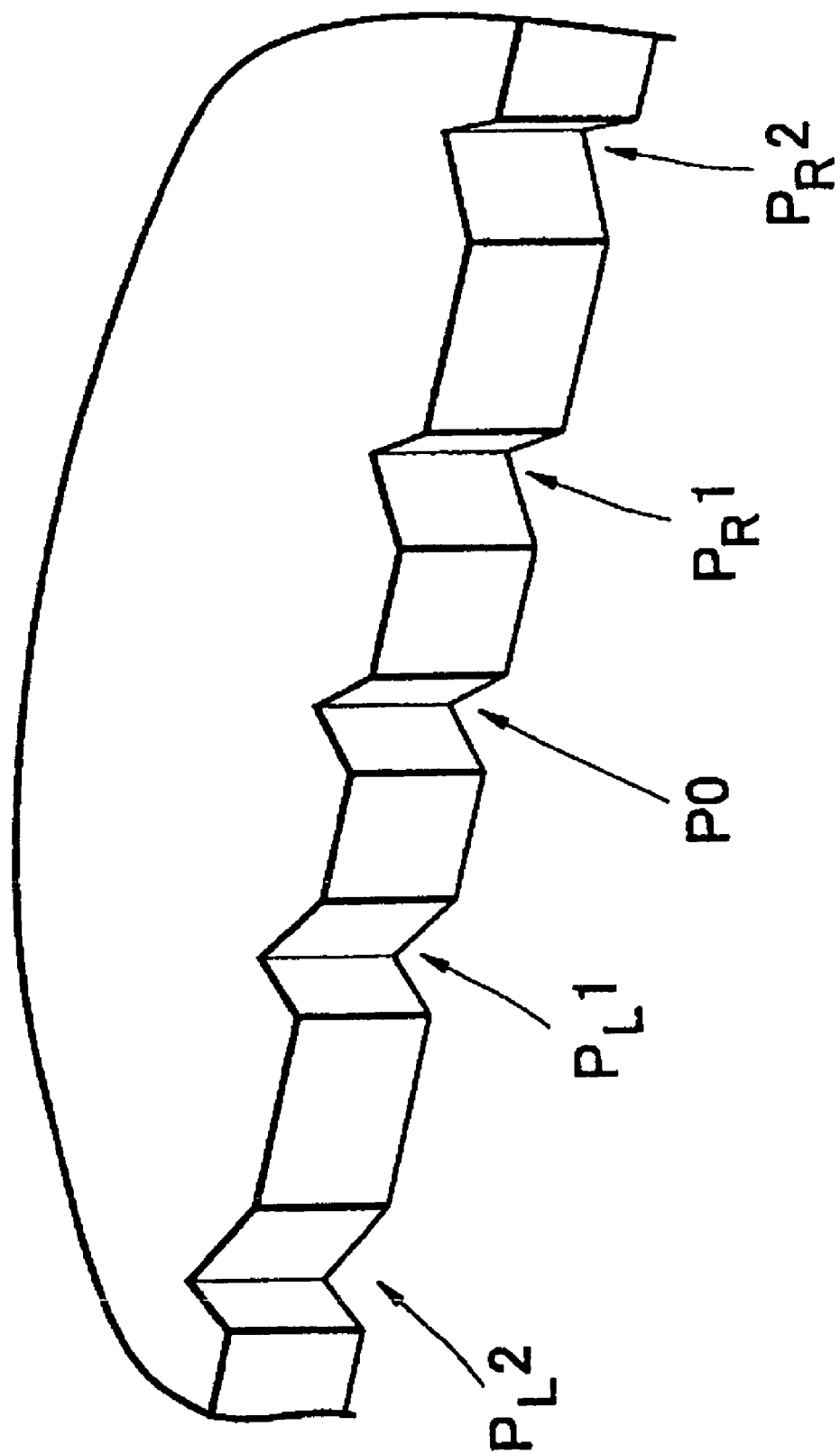
FIG. 2 is a schematic enlarged perspective view showing a portion of the light introducing portion according to the embodiment shown in FIG. 1.

The preferred embodiments of the surface light emitting apparatus according to the present invention will now be described below with reference to the accompanying drawings.

The surface light emitting apparatus of an embodiment of the present invention comprises a light source 2, a light emitting surface 11, an end face, and an optical waveguide plate 1 introducing light emitted from the end face and outputting light through the light emitting surface 11.

More specifically, the optical waveguide plate 1 of an embodiment of the present invention includes an optical waveguide plate 1 of a surface light emitting apparatus for introducing light emitted from a point light source 2 through the incident end face 3 and emitting uniform light from the entire surface of the light emitting surface 11. The optical waveguide plate 1 includes special characteristic features in the construction of at least one of the light introducing portions 12a, 12b, and 12c.

Here, the incident end face 3 of the light introducing portion 12 faces the light source 2 and normally comprises a plurality of notched prisms which are made in the end face so as to disperse light emitted from the light source 2 it is introduced and passed through the optical waveguide plate 1.

Overall Construction of the Optical Waveguide Plate 1 of the Present Embodiment As shown in FIG. 1, the optical waveguide plate 1 comprises the light emitting surface 11, which is on one side of the main surface, an end face of the incident side 11a, an opposite end face 11b (which is opposite to the end face of the incident side 11a) and side faces 11c and 11d. The optical waveguide plate 1 further comprises the incident end face 3 which can be different from the end face of the incident side 11a. The incident end face 3 comprises an end face of the light introducing portion 12 which is constructed on the end face of the incident side 11a. The light introducing portions 12a, 12b, 12c are constructed on the incident end face 3. The general outline of the light introducing portion 12 is formed like a trapezoid so that the incident end face 3 corresponds to the upper base of the trapezoid.

In addition, the light introducing portion 12 is a structure aimed at dispersing incident light when the incident light is introduced to the main portion of the optical waveguide plate 1. The light emitting surface 11 of the optical waveguide plate 1 comprises the portion between the incident end face 11a and its opposite end face 11b.

In addition, the construction of the optical guide plate of the present invention is not limited to the construction described in FIG. 1. In the case where the light introducing portion 12 is not formed or included, the incident-side end face 11a may be designed as the incident end face 3 and the light introducing portions 12a, 12b, and 12c may be directly formed therein.

Light Introducing Portions

Each of the light introducing portions 12a, 12b, and 12c, formed on the optical waveguide plate 1 according to the present embodiment comprise a plurality of notched prisms P0, $P_R k$ (k=1, 2, 3, ... n), and $P_L k$ (k=1, 2, 3, ... m). Each portion has a novel construction so that the optical waveguide plate 1 of the present invention can uniformly disperse incident light emitted from a point source 2 throughout the light emitting surface 11. This structure allows an extremely high uniformity in emission from the light emitting surface 11. In addition, in the present embodiment, the light emitting center of each point source 2 is arranged to face the center of each of the light introducing portions 12a, 12b, 12c. In addition, when viewed from the light emitting surface 11 of the optical waveguide plate 1, the shape of the central notched prism P0, which is formed in the middle of the light introducing portions 12a, 12b and 12c can be a predetermined desired shape. These shape include an isosceles triangle, a regular triangle, or the like, according to the directional characteristics of the light source 2.

In addition, the location where each notched prism is formed on the end face of the optical waveguide plate 1, helps determine the angle, the depth, the size, and the interval of each notched prism. However, these configurations are not specifically limited in the present invention. A notched prism, formed for example as triangular prism, will be described in the present specification by describing its angles, height or depth, size, interval and the like, on the upper surface of the light emitting surface 11. In the present specification, with respect to the notched prisms $P_R k$ (k=1, 2, 3, ... n) and $P_L k$ (k=1, 2, 3, ... m) other than the central notched prism P0, if the notched prisms are formed on the light introducing portions 12 with intervals in between, these will be referred to as the single notched prisms. However, the concept of the single notched prisms may also be included when simply referring to a notched prism.

(1) Interval between the two adjacent notched prisms

In the present invention, when the central notched prism P0 is located in the center, the intervals between the notched prisms $P_R k$, $P_L k$ are arranged to become greater in proportion to the distance from the central notched prism P0.

Figure 3:
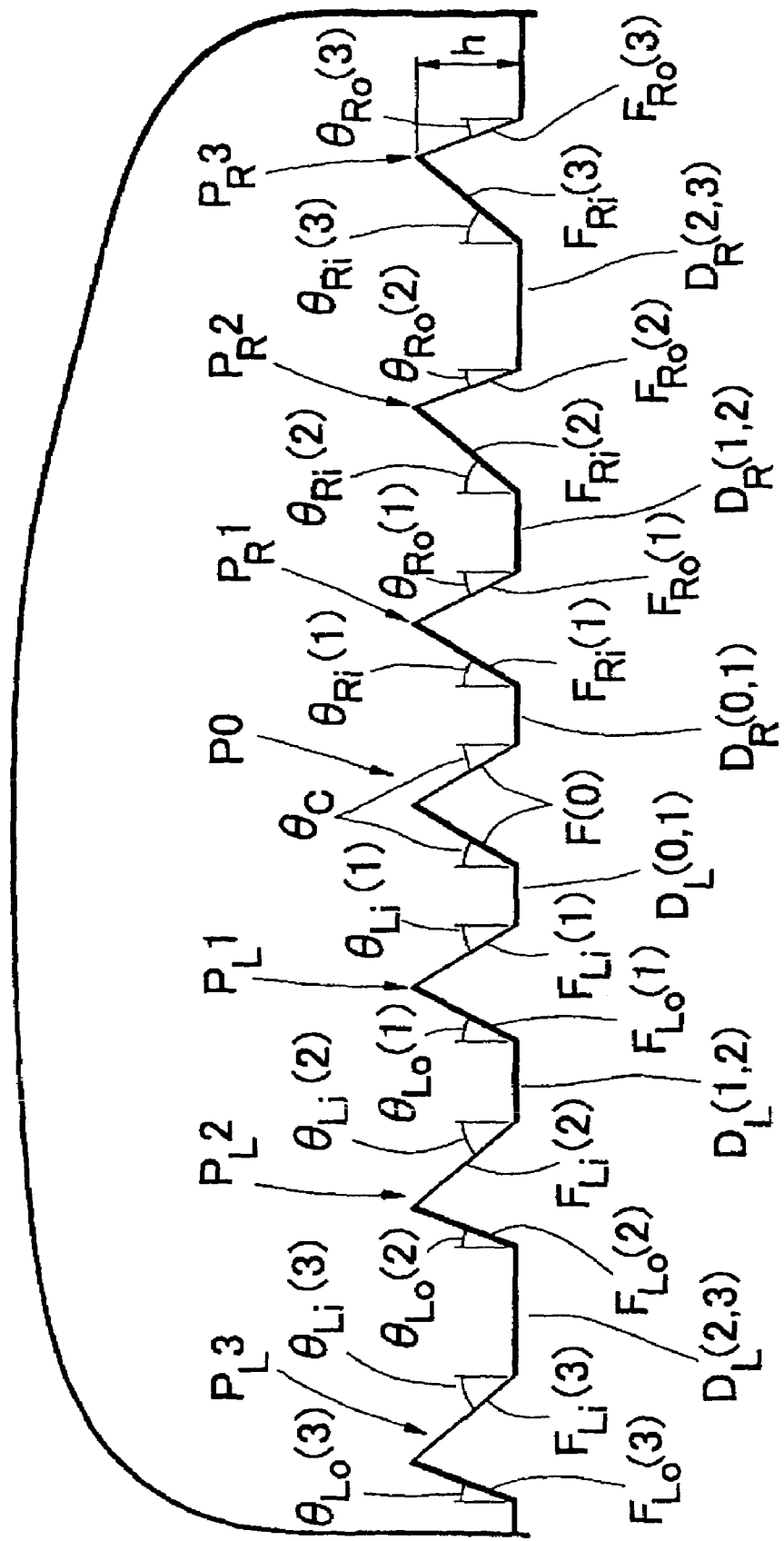
FIG. 3 is a schematic plan view showing the detailed light introducing portion of a further embodiment according to the present invention.

That is, in the light introducing portions 12a, 12b, 12c of the present embodiment as shown in FIG. 3, the intervals between the notched prisms $D_R(k, k+1)$, $D_L(k, k+1)$ are set to satisfy the conditions $D_R(0, 1) < D_R(1, 2) < D_R(2, 3) \ldots$, and $D_L(0, 1) < D_L(1, 2) < D_L(2, 3) \ldots$. The light introducing portion may be referred to hereinafter as reference numeral 12 so as to describe a representative light introducing portion.

Here, the interval $D_R(k, k+1)$ between the notched prisms shows the distance between the notched prism $P_R k$, a k-th prism to the right of the central notched prism P0, and the adjacent notched prism $P_R k+1$ which is located further away from the central notched prism P0. The interval $D_L(k, k+1)$ between the notched prisms shows the distance between the notched prism $P_L k$, a k-th prism to the left of the central notched prism P0, and the adjacent notched prism $P_L k+1$ which is located further away from the central notched prism P0.

Figure 4:
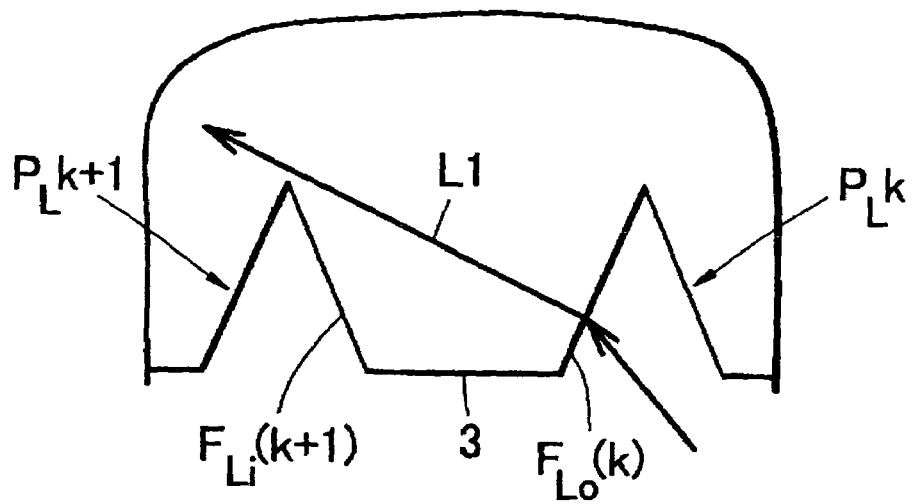
FIG. 4 is a schematic plan view for explaining the effect of the light introducing portion according to still another embodiment of the present invention.

As shown in FIG. 4, the light introducing portion 12 having the construction described above can introduce and disperse light more efficiently in the optical waveguide plate 1.

That is, as shown in FIG. 4, light L1 emitted from the light source 2 is introduced into the optical waveguide plate 1 at an angle which is the angle of incidence to the incident end face 3. This incidence angle becomes greater in proportion to the distance from the emission center of the notched prisms which are located further from the emission center of the light source 2.

Therefore, in the present embodiment, as the distance between the notched prism $P_L k$ and its adjacent notched prism $P_L k+1$ becomes greater, the rate of reflection of light introduced from the outer incident face $F_{Lo}(k)$ of the notched prism $P_L k$ that is reflected by the inner incident face $F_{Li}(k+1)$ of the notched prism $P_L(k+1)$ can be reduced.

Figure 5:
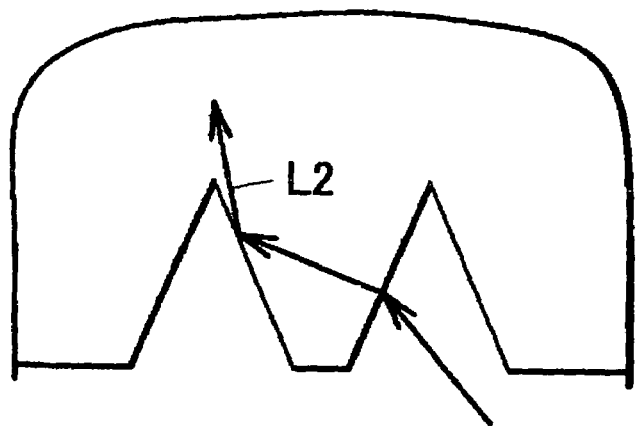
FIG. 5 is a comparative schematic plan view for the purpose of explaining the effect of the light introducing portion according to yet another embodiment of the present invention.

On the other hand, FIG. 5 shows the situation when the interval between a pair of adjacent notched prisms disposed further from the emission center of the light source 2 and the interval between a pair of adjacent notched prisms disposed closer to the center are the same (or the intervals between the notched prisms are all set to be equal). In such a construction, the rate of light reflection, defined as where incident light L2 introduced from the outer incident face of either of the notched prisms is reflected by the inner incident face of another notched prism, becomes greater at a pair of notched prisms which are disposed further from the emission center of the light source 2.

In other words, in order to reduce the rate of light which is introduced from the outer incident face of the prism disposed closer to the center and which is reflected by the inner incident face of another notched prism, the interval between the two adjacent notched prisms is made in relationship to the distance from the emission center of the light source 2.

(2) Respective angles made by outer incident face, inner incident face and incident end face 3 in each notched prism In addition, in a preferred embodiment of the light introducing portion 12 of the optical waveguide plate 1, the angle made by the outer incident face and the incident end face 3 and the angle made by the inner incident face and the incident end face 3 are set as described below.

That is, in the light introducing portion 12 of the present embodiment, the notched prisms are set in such a way that the angle made by the outer incident face and the plane perpendicular to the incident end face 3 is set to become smaller in proportion to the distance from the center of the light introducing portion 12. Further, the angle made by the inner incident face and the plane perpendicular to the incident end face 3 is set to become greater.

Accordingly, the feature of the outer incident face and the inner incident face shown above can be described with an angle, such that, the angle made by the outer incident face and the incident end face 3 is set to become smaller in proportion to the distance from the central notched prism P0, and the angle made by the inner incident face and the incident end face 3 is set to become greater in the proportion to the distance from the central notched prism P0.

The construction described above is shown with reference numerals in FIG. 3. When the angle made by an incident face of the central notched prism P0 and the plane perpendicular to the incident end face 3 is indicated as θc, the angle $θ_{Li}(1)$, $θ_{Li}(2)$, $θ_{Li}(3)$, ... of the inner incident face, which is made by the inner incident face $F_{Li}(1)$, $F_{Li}(2)$, $F_{Li}(3)$ and the plane perpendicular to the incident end face 3, ... of each notched prism $P_L1$, $P_L2$, $P_L3$, ... is set to satisfy the condition $θc<θ_{Li}(1)<θ_{Li}(2)<θ_{Li}(3)$ .... Further, the angle $θ_{Ri}(1)$, $θ_{Ri}(2)$, $θ_{Ri}(3)$, ... of each inner incident face which is made by each inner incident face $F_{Ri}(1)$, $F_{Ri}(2)$, $F_{Ri}(3)$ of each notched prism $P_R1$, $P_R2$, $P_R3$, ... is set to satisfy the condition $θc<θ_{Ri}(1)<θ_{Ri}(2)<θ_{Ri}(3)$ ....

In addition, the angle of each outer incident face $θ_{Lo}(1)$, $θ_{Lo}(2)$, $θLo(3)$, ..., which is made by each outer incident face $F_{Lo}(1)$, $F_{Lo}(2)$ $F_{Lo}(3)$, ... of each notched prism $P_L1$, $P_L2$, $P_L3$, ..., is set to satisfy the condition $θc>θ_{Lo}(1)>θ_{Lo}(2)>θ_{Lo}(3)$ .... Further, the angle of each outer incident face $θ_{Ro}(1)$, $θ_{Ro}(2)$, $θ_{Ro}(3)$, ..., which is made by the outer incident face $F_{Ro}(1)$, $F_{Ro}(2)$, $F_{Ro}(3)$, ..., and the plane perpendicular to the incident end face 3 of each notched prism $P_R1$, $P_R2$, $P_R3$, ... is set to satisfy the condition $θc>θ_{Ro}(1)>θ_{Ro}(2)>θ_{Ro}(3)$ ....

Figure 6:
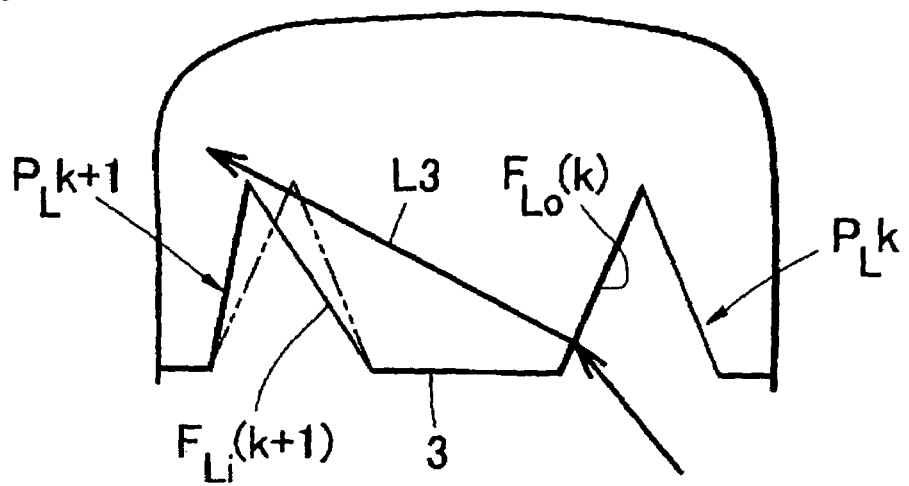
FIG. 6 is a schematic plan view for explaining another effect of the light introducing portion according to the present invention.

As shown in FIG. 6, the light introducing portion 12 constructed as described above is capable of introducing and dispersing light more efficiently in the optical waveguide plate 1.

That is, as shown in FIG. 6, when light L3, emitted from the light source 2 towards the notched prism $P_Lk$, is introduced from the outer incident face $F_{Lo}(k)$ of the notched prism $P_Lk$, the probability that the incident light L3 is reflected by the inner incident face $F_{Li}(k+1)$ of the adjacent notched prism $P_Lk+1$ can be reduced. In the case where the angles of inner incident faces and the angles of outer incident faces of each of the notched prisms are not set as described above, as for example, when the angle of the inner incident face and the outer incident face is set to be identical for all notched prisms, the probability that the incident light L3 is reflected by the inner incident face $F_{Li}(k+1)$ of the adjacent notched prism $P_Lk+1$ will be increased.

In other words, in the present invention, the angles of the inner incident face and the outer incident face of the notched prism are set in relationship with the distance of the notched prisms from the emission center. This is in order to reduce the rate of reflection caused when incident light introduced from the outer incident face of an inner prism of a pair of adjacent notched prisms is reflected by the inner incident face of the other notched prism.

(3) Angle made by the outer incident face and the inner incident face of each notched prism In the light introducing portion 12 of FIGS. 10, 11, 18, and 19, each notched prism may be constructed in such a way that the angle made by the outer incident face $F_{Lo}(k)$ or $F_{Ro}(k)$ and the respective inner incident face $F_{Li}(k)$ or $F_{Ri}(k)$, is set to become smaller in proportion to the distance from the center of the light introducing portion 12.

Figure 11:
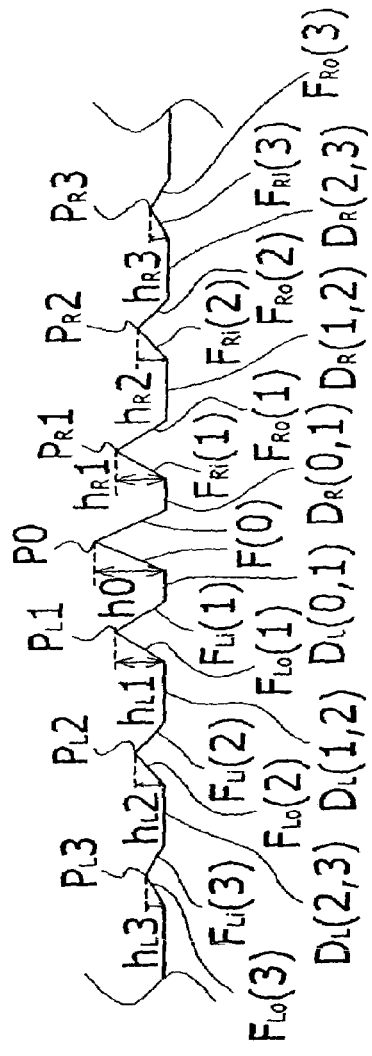
FIG. 11 is a schematic plan view showing the detailed light introducing portion of another embodiment according to the present invention.
Figure 19:
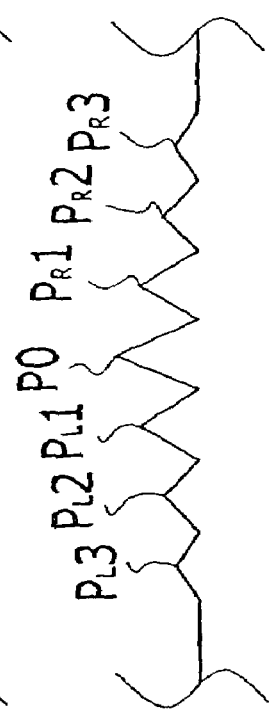
FIG. 19 is a schematic plan view showing the detailed light introducing portion of another embodiment according to the present invention.
Figure 20:
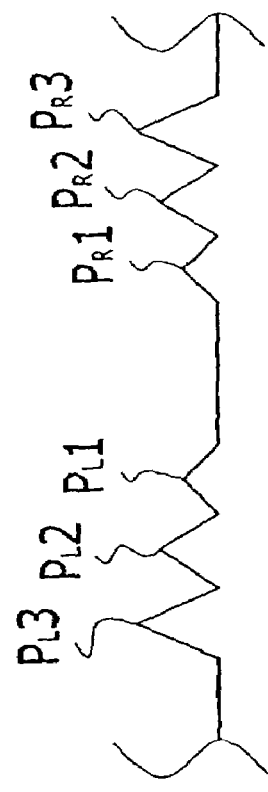
FIG. 20 is a schematic plan view showing the detailed light introducing portion of yet another embodiment according to the present invention.
Figure 21:
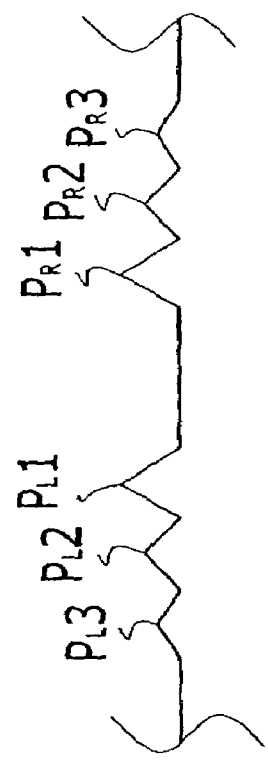
FIG. 21 is a schematic plan view showing the detailed light introducing portion of still yet another embodiment according to the present invention.
Figure 22:
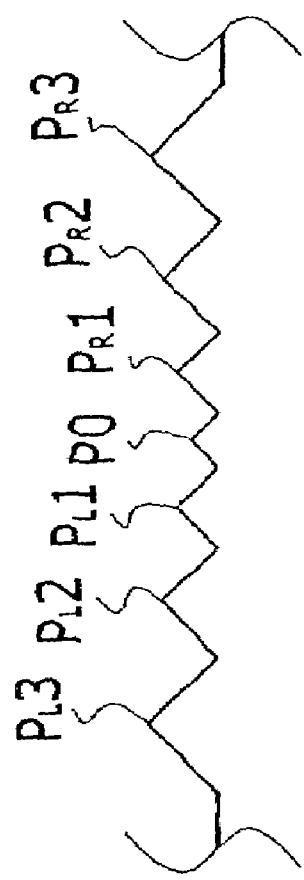
FIG. 22 is a schematic plan view showing the detailed light introducing portion of another embodiment according to the present invention.

As shown in FIGS. 11 and 19, the angle $θP_Rk$ which is made by the inner incident face $F_{Ri}(k)$ and the outer incident face $F_{Ro}(k)$ is set to satisfy the condition $P0<P_R1<P_R2<P_R3$ ..., respectively. Also, the angle $θP_Lk$ which is made by the inner incident face $F_Li(k)$ and the outer incident face $F_{Lo}(k)$ is set to satisfy the condition $P0<P_L1<P_L2<P_L3$ ..., respectively. In addition, in relation to this type of angle setting, when the opening w of all of the notched prisms are set to be the same width, the height (or depth) h of the notched prism (the height from the top of the notched prism to the plane of the incident end face 3) is set to satisfy the relationship $h0>h_R1>h_R2>h_R3$ ..., and $h0>h_L1>h_L2>h_L3$ .... In addition, the angles $θ_{Ri}(k+1)$, $θ_{Li}(k+1)$ made by the inner incident face $F_{Ri}(k+1)$, $F_{Li}(k+1)$ of a notched prism and the plane perpendicular to the incident end face $D_R(k, k+1)$, $D_L(k, k+1)$, respectively, are set to be equal. Also, the angles $θ_{Ro}(k+1)$, $θ_{Lo}(k+1)$ made by the inner incident face $F_{Ro}(k+1)$, $F_{Lo}(k+1)$ of a notched prism and the plane perpendicular to the incident end face $D_R(k+1, k+2)$, $D_L(k+1, k+2)$, respectively, are set to be equal.

Incident light can also be introduced effectively in the lateral direction (perpendicular to the axis of the light source 2) in the light introducing portion 12 having the construction described above.

That is, in the light introducing portion 12 of the present embodiment, the angles $θP_Lk$ and $θP_Rk$ of the notched prisms are set to become greater in proportion to the distance from the center of the light introducing portion 12. Consequently, the depth of the notched prism becomes smaller. This means that in a pair of adjacent notched prisms, the rate of light reflection can be reduced. The light reflection means where incident light introduced from the outer incident face of a notched prism located closer to the center of the light introducing portion 12 is reflected by the inner incident face of the other notched prism located further from the center of the light introducing portion 12.

In addition, as described above, the effect of the present invention can be obtained by varying an interval $D_L(k, k+1)$, $D_R(k, k+1)$ of two adjacent notched prisms. Also, by setting an interval of the notched prisms formed further from the central notched prism P0 to be wider than those closer to the central notched prism P0, even where an angle of a notched prism formed outer portion is set to be smaller in the present embodiment, this result can be achieved. In other words, in the light introducing portion 12 of the present embodiment, shown in FIG. 10, the angle $θP_Rk$ of the inner incident face $F_{Ri}(k)$ and the outer incident face $F_{Ro}(k)$ is set to respectively satisfy the relation $P0>P_R1>P_R2>P_R3$ .... Also, the angle $θP_Lk$ of the inner incident face $F_{Li}(k)$ and the outer incident face $F_{Lo}(k)$ is set to respectively satisfy the condition $P0>P_L1>P_L2>P_L3$ .... In addition, according to setting these the angles, in the case where all openings of the notched prisms are set to be the same width, the height h of the notched prism (the height from the top of a notched prism to the bottom of the incident end face 3) will be $h0<h_R1<h_R2<h_R3$ ..., and $h0<h_L1<h_L2<h_L3$ ..., respectively. In addition, the angles $θ_{Ri}(k+1)$ and $θ_{Li}(k+1)$ made by the inner incident faces $F_{Ri}(k+1)$, $F_{Li}(k+1)$ and the incident end faces $D_R(k, k+1)$, $D_L(k, k+1)$, respectively, are set to be equal. Also, the angles $θ_{Ro}(k+1)$ and $θ_{Lo}(k+1)$ made by the outer incident faces $F_{RO}(k+1)$, $F_{LO}(k+1)$ and the incident end faces $D_R(k+1, k+2)$, $D_L(k+1, k+2)$, respectively, are set to be the same.

As described above, even when the heights $h_Rk$, $h_Lk$ of the notched prisms $P_Rk$, $P_Lk$ are set to be greater in proportion to the distance from the central notched prism P0, the intervals between adjacent notched prisms $D_L(k, k+1)$ and $D_R(k, k+1)$ are set to become greater in proportion to the distance from the central notched prism P0. This prevents interruption of light that is introduced from the outer incident face of a notched prism and reflected by the inner incident face of the adjacent notched prism.

Figure 26:
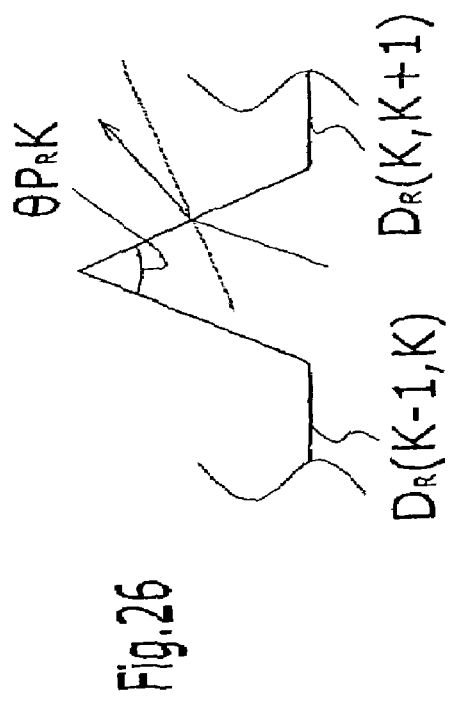
FIG. 26 is a schematic plan view for explaining another effect of the light introducing portion according to still another embodiment.
Figure 27:
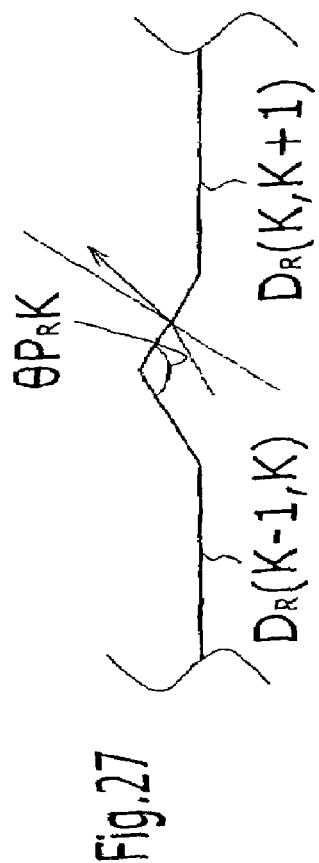
FIG. 27 is a comparative schematic plan view for the purpose of explaining the effect of the light introducing portion according to yet another embodiment of the present invention.

Setting the angles $θP_Lk$ and $θP_Rk$ of the notched prisms to be smaller in proportion to the distance from the center of the light introducing portion 12 is shown in FIG. 26. In a notched prism formed further from the light emitting center, the incident light, which is refracted toward the line normal to its outer incident face, can be directed closer to the direction approximately perpendicular to the axis of the emitted light. Thus, more of the incident light can be dispersed in the lateral direction. On the other hand, as shown in FIG. 27, the angles $\theta P_L k$ and $\theta P_R k$ of a notched prism are set to be greater in proportion to the distance from the center of the light introducing portion 12. Thus, in a notched prism formed further from the light emitting center, the incident light, which is refracted toward the line normal to its outer incident face, can be directed away from the direction approximately perpendicular to the axis of the emitted light. Thus, light dispersion in the lateral direction will be difficult.

(4) Width of the notched prism

In addition, the light introducing portion 12 of the present embodiment, is shown in FIGS. 14, 15, 22, and 23. Each of the plurality of notched prisms may be arranged so as to be formed with a similar shape in the sense of similar polygons or similar triangles. Also, each of the prisms has various opening widths.

As used herein, the term similar triangles means triangles whose corresponding angles are equal and the corresponding sides are proportional in length.

Figure 23:
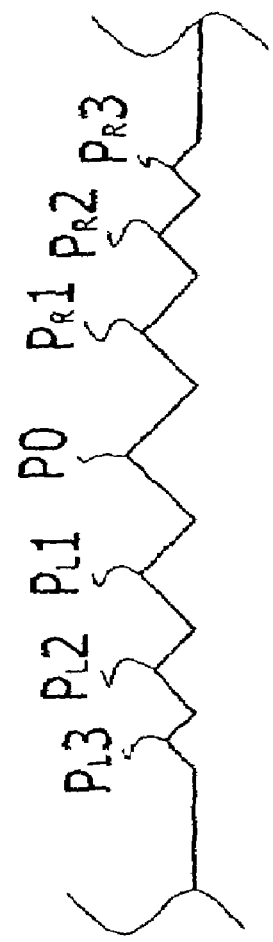
FIG. 23 is a schematic plan view showing the detailed light introducing portion of still another embodiment according to the present invention.
Figure 24:
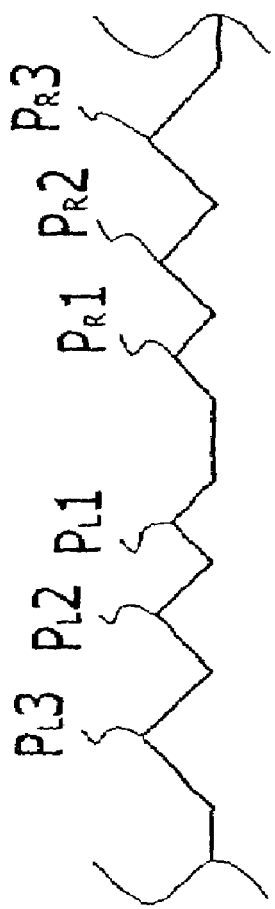
FIG. 24 is a schematic plan view showing the detailed light introducing portion of yet another embodiment according to the present invention.
Figure 25:
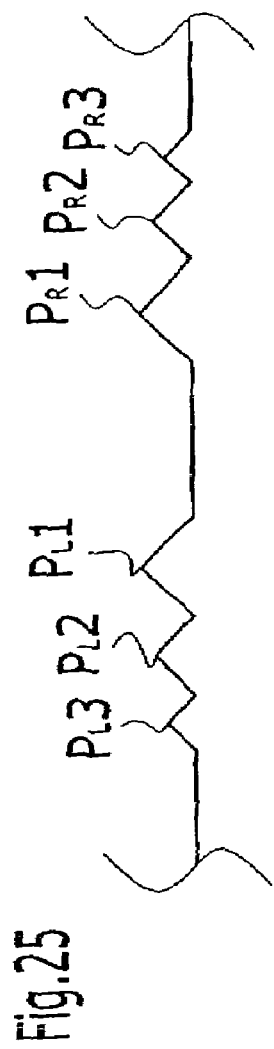
FIG. 25 is a schematic plan view showing the detailed light introducing portion of another embodiment according to the present invention.

It is preferable that the notched prisms $P_R k$, $P_L k$ in the light introducing portion 12 shown in FIGS. 14 and 23, be formed with similar shapes that become smaller toward each end portion of the light introducing portion 12 and away from the central notched prism P0. Also, this can include setting the opening w of each notched prism to satisfy the condition $W0 > W_R1 > W_R2 > W_R3$ . . . , and $W0 > W_L1 > W_L2 > W_L3$ . . . , respectively.

In addition, the height h of the notched prism can be set to satisfy the relationship $h0 > h_R1 > h_R2 > h_R3$ . . . , and $h0 > h_L1 > h_L2 > h_L3$ . . . , respectively. That is, the width of the opening is set to become smaller at a constant rate from the center while maintaining the apex angle constant.

As in the light introducing portion 12 constructed as described above, light can also be introduced effectively by forming the notched prisms in similar shapes and decreasing in size in proportion to the distance from the center notched prism P0. The rate of light introduced from the outer incident face of the inner notched prism reflected by the inner incident face of another notched prism can be reduced.

Moreover, as described above, by forming an interval between two adjacent prisms, especially by arranging an interval of the notched prisms formed further from the central notched prism P0 to be wider, the effect of the present invention can be further enhanced. In addition, in the present embodiment, as shown in FIG. 14, an excellent effect can also be obtained by arranging the intervals $D_L(k, k+1)$ and $D_R(k, k+1)$ of the notched prisms $P_L k$ and $P_R k$ to become smaller in proportion to the distance from the central notched prism P0. That is, in a pair of adjacent notched prisms, the rate of light introduced through from the outer incident face of the inner notched prism reflected by the inner incident face of the other notched prism can be reduced to a relatively small proportion.

Figure 15:
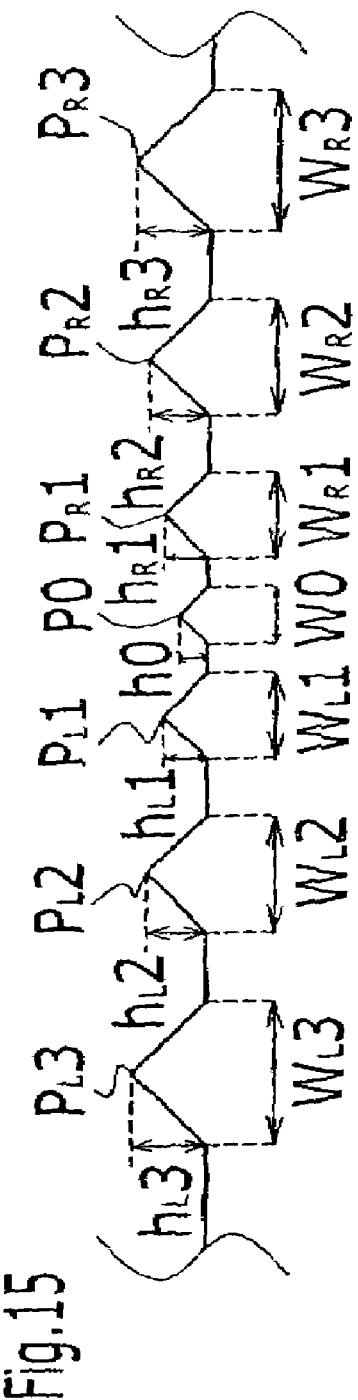
FIG. 15 is a schematic plan view showing the detailed light introducing portion of a still further embodiment according to the present invention.

In addition, as shown in FIG. 15, by arranging the intervals of the two adjacent notched prisms formed further from the central notched prism P0 to become wider, the notched prisms having similar shapes can be set to become greater on either side in proportion to the distance from the central notched prism P0. That is, in the light introducing portion 12 of the present invention, the notched prisms $P_R k$ and $P_L k$ are set to become greater in similar figures on either side in proportion to the distance from the central notched prism P0, and the opening w of a notched prism is set to satisfy the conditions $W0 < W_R1 < W_R2 < W_R3$ . . . , and $W0 < W_L1 < W_L2 < W_L3$ . . . , respectively. In addition, the depth h of a notched prism is set to satisfy the relationships $h0 < h_R1 < h_R2 < h_R3$ . . . , and $h0 < h_L1 < h_L2 < h_L3$ . . . , respectively. As used herein, the term similar figures means two figures or bodies that are identical except for size.

As described above, in the case where the heights (and widths) of the notched prisms increase on either side of the central notched prism P0 in proportion to the distance from the central notched prism P0, the rate of light introduced from the outer incident face of an inner notched prism reflected by the inner incident face of an adjacent outer notched prism will be increased. This rate can be reduced by gradually increasing the intervals between adjacent notched prisms on either side in proportion to the distance from the central notched prism P0. Moreover, it is possible to increase the sizes of the prisms located in the corner portions or in the darkened portions between the light sources 2 of the optical waveguide plate 1. Thus, more light can be introduced through the outer incident face. Therefore, incident light can be effectively dispersed in a direction approximately perpendicular to the optical axis.

Figure 16:
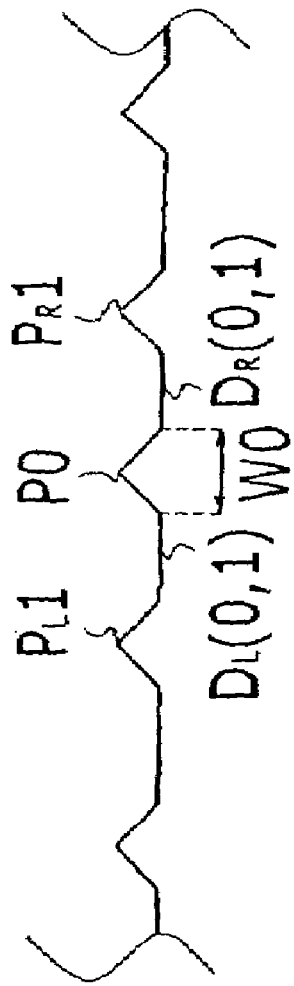
FIG. 16 is a schematic plan view showing the detailed light introducing portion of another embodiment according to the present invention.

(5) Relationship between the opening width of the central notched prism P0 and the interval between the central notched prism P0 and its adjacent prisms In the light introducing portion 12 of the present embodiment, as shown in FIG. 16, the opening width W0 of the central notched prism P0 facing the emission center, and the intervals $D_R(0,1)$ and $D_L(0,1)$ between the central notched prism P0 and its adjacent notched prisms $P_R1$ and $P_L1$ may be set to be approximately the same.

Figure 17:
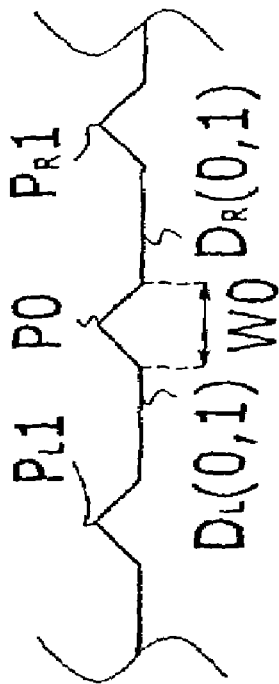
FIG. 17 is a schematic plan view showing the detailed light introducing portion of yet another embodiment according to the present invention.
Figure 18:
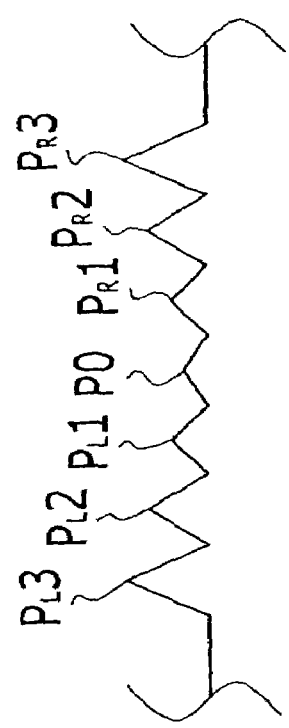
FIG. 18 is a schematic plan view showing the detailed light introducing portion of a further embodiment according to the present invention.

In addition, the opening width W0 of the central notched prism P0 can be greater than the intervals $D_R(0,1)$ and $D_L(0,1)$ of the two adjacent notched prisms $P_R1$ and $P_L1$ thereof. As shown in FIG. 17, by making the opening width W0 smaller than the intervals $D_R(0,1)$ and $D_L(0,1)$, a more uniform surface emission can be obtained.

A relatively high amount of light emitted toward the central notched prism P0 travels from the light source 2 in the direction that approximates the optical axis. Therefore, when the direction of light is changed to be approximately perpendicular to the optical axis, the amount of light reaching the opposite end face 11b at the tip portion of the optical waveguide plate 1 will be reduced. A portion of the optical waveguide plate 1 closer to the light source 2 may become significantly brighter than another portion and so a preferable surface light emission may not be obtained. For this reason, such a problems can be prevented by making the opening width W0 of the central notched prism P0 approximately the same as, or smaller than the interval between the two adjacent notched prisms $P_L1$, $P_R1$.

(6) Flat portion set to face the light emission center

In the optical waveguide plate 1 of the present invention described above, in the light introducing portion 12, the flat portion D(0) of two adjacent notched prisms may face the light emission center. As shown in FIGS. 9, 12, 13, 20, 21, 24, and 25, a central notched prism P0 is not formed in the light introducing portion 12. Also, a plurality of notched prisms $P_R k$ and $P_L k$ are formed on either side of the flat portion D(0), which is used instead of the central notched prism P0. In such a case, the notched prisms $P_L1$ and $P_R1$ are formed so as to be adjacent to the flat portion D(0).

By having this construction, the flat portion D(0) is arranged on the light introducing portion 12 facing the light emission center so that light traveling from the light source 2 in the direction of its axis can be guided through the tip portion of the optical waveguide plate 1. Moreover, by forming the notched prisms $P_Rk$ and $P_Lk$ on either side of the flat portion D(0), light having large incident angle to the incident end face 3 can be efficiently dispersed in the width direction of the optical waveguide plate 1. In portions of the incident end face which are located away from the light emission center, light having a large incident angle can be introduced into the optical waveguide plate 1 and can be dispersed in the width direction thereof.

In addition, the size of the flat portion D(0), formed by a portion of the end face 3 of the light introducing portion 12, can be determined in view of the directivity (relative light direction property), the luminous energy, and other optical properties of the light source 2 in order to obtain the desired light emitting surface 11.

In the optical waveguide plate 1 of the present embodiment as the intervals of the adjacent notched prisms $P_Rk$ and $P_Lk$ increase in size in proportion to the distance from the central notched prism P0 in the light introducing portion 12, incident light can be efficiently dispersed as it is introduced. Thus, the size of the darkened portion 50 (shown with dotted line in FIG. 1), formed in the vicinity of the incident end face 3 of the light emitting surface 11 can be reduced.

In the light introducing portion 12 of the optical waveguide plate 1 of the present embodiment, the angle made by the outer incident face and the incident end face 3 is set to become greater in proportion to the distance from the central notched prism P0. Also, the angle made by the inner incident face and the incident end face 3 decrease in proportion to the distance from the central notched prism P0. Therefore, incident light can be dispersed more efficiently and the darkened portions in the vicinity of the incident end face 3 of the light emitting surface 11 can be reduced further.

Also, in the light introducing portion 12 of the optical waveguide plate 1 of the present embodiment, the apex angle of a notched prism, formed by the outer incident face and the inner incident face, may vary. It is preferable that the apex angle of a notched prism, made by the outer incident face and the inner incident face, increases in proportion to the distance from the central notched prism P0.

According to such a construction, incident light can also be efficiently dispersed without being interrupted, and a darkened portion formed in the vicinity of the incident end face 3 of the light emitting surface 11 can be eliminated.

Further, in the light introducing portion 12 of the optical waveguide plate 1 of the present embodiment, the notched prisms may be set to have similar figures (such as similar triangles) and different opening widths. It is preferable that the notched prisms become smaller in proportion to the distance from the central notched prism P0. According to such a construction, incident light can be dispersed without being interrupted and darkened portions formed in the vicinity of the incident end face 3 of the light emitting surface 11 can be eliminated.

Moreover, in the light introducing portion 12 of the optical waveguide plate 1 of the present embodiment, when the opening width W0 of the central notched prism P0 and the intervals $D_L(0,1)$ and $D_R(0,1)$ between the central notched prism P0 and the notched prisms $P_L1$ and $P_R2$ adjacent to the central notched prism P0 are approximately the same, a uniform surface emission can be more efficiently obtained. Also, if the opening width W0 is set to be smaller than the intervals $D_L(0,1)$ and $D_R(0,1)$ between the central notched prism P0 and the notched prisms $P_L1$ and $P_R2$ adjacent to the central notched prism P0, a uniform surface emission can also be more efficiently obtained.

When a flat portion D(0) is formed on the light introducing portion 12 so as to face the light emission center, and the notched prisms are formed on each side, a sufficient amount of light traveling straight in the direction of optical axis can be distributed to the opposite end face.

As described above, in the light emitting apparatus of the present invention, the most suitable shapes of the notched prisms and the most effective intervals can be chosen according to the shape of an optical waveguide plate 1 and the directivity of the light source 2. This is done so that the incident light can be effectively dispersed and emitted through the whole surface of the optical waveguide plate 1. A complex dispersion of light and an improved uniformity in luminance can be obtained by increasing the number of notched prisms and thus increasing the number of side faces. However, the configuration of a metal mold will also become complicated, and irregular formation of the end faces of the optical waveguide plates 1 may occur.

For this reason, it is preferable to choose a configuration based on the manufacturing conditions as well as the required specifications for the purpose. Various kinds of configurations can be chosen according to the present invention so that selection of the shape of the notches can be made in a comprehensive manner. These configurations are chosen in view of the following items: the size of the optical waveguide plate 1, the number of light sources 2, their directivity, the aimed performance, restrictions on forming the metal mold, the accuracy of the molding process, and the like.

Furthermore, as a more favorable embodiment of the present invention, a light introducing portion 12 is formed which does not include the light emitting surface 11 and a light shielding portion is added to cover the upper surface of the light introducing portion 12.

According to this construction, light leakage from the notched prisms can be effectively prevented, and the uniformity of the light emission from the light emitting surface 11 can be improved.

In order to achieve a more uniform light intensity, a surface treatment such as texturing can be used. The surface treatment can include a plurality of dots or rows of prisms with a predetermined density on the reflecting faces and/or the light emitting surface 11. As described herein, the dots are a plurality of depressions or protrusions formed on the reflecting face etc. in order to disperse light, and the luminance distribution on the emitting surface can be adjusted in relation to the density. Furthermore, the shape of the dot is not limited to a simple depression or protrusion. For example, a depression having a mounded center or a protrusion having a recessed circumference can also be used.

In addition, the alignment of the dots can be made either in order or in random. The dot pattern can also be a combination of ordered areas and random dot pattern areas in such a way as to satisfy the predetermined density.

The above-mentioned embodiments are described by way of examples using a triangle prism. However, the present invention is not limited by those examples, and a triangle pyramid P100 shown in FIG. 7 can also be used as a notched prism.

A notched triangle prism and a notched triangle pyramid have different effectiveness properties in the operation as described below.

A notched triangle prism is extremely effective in dispersing light emitted from the light source 2 in the lateral (right and left) directions.

Consequently, by combining the notched triangle prisms and the construction characteristics of the present invention (wherein the intervals between two adjacent notched prisms $P_Rk$ and $P_Lk$ increase in proportion to the distance from the center of the light introducing portion 12), a more preferable light dispersion effect can be obtained. Furthermore, by adding the following constructions in the notched prisms, further preferable light dispersion effects can be obtained. That is, the angle made by the outer incident face and the plane perpendicular to the incident end face 3 decreases in proportion to the distance from the center of the light introducing portion 12, and the angle between the inner incident face and the plane perpendicular to the incident end face 3 increases in proportion to the distance from the center of the light introducing portion 12.

In other hand, with a notched triangle pyramid, the light dispersing effect in the lateral (right and left) directions is not as significant as in the notched triangle prism.

Figure 7:
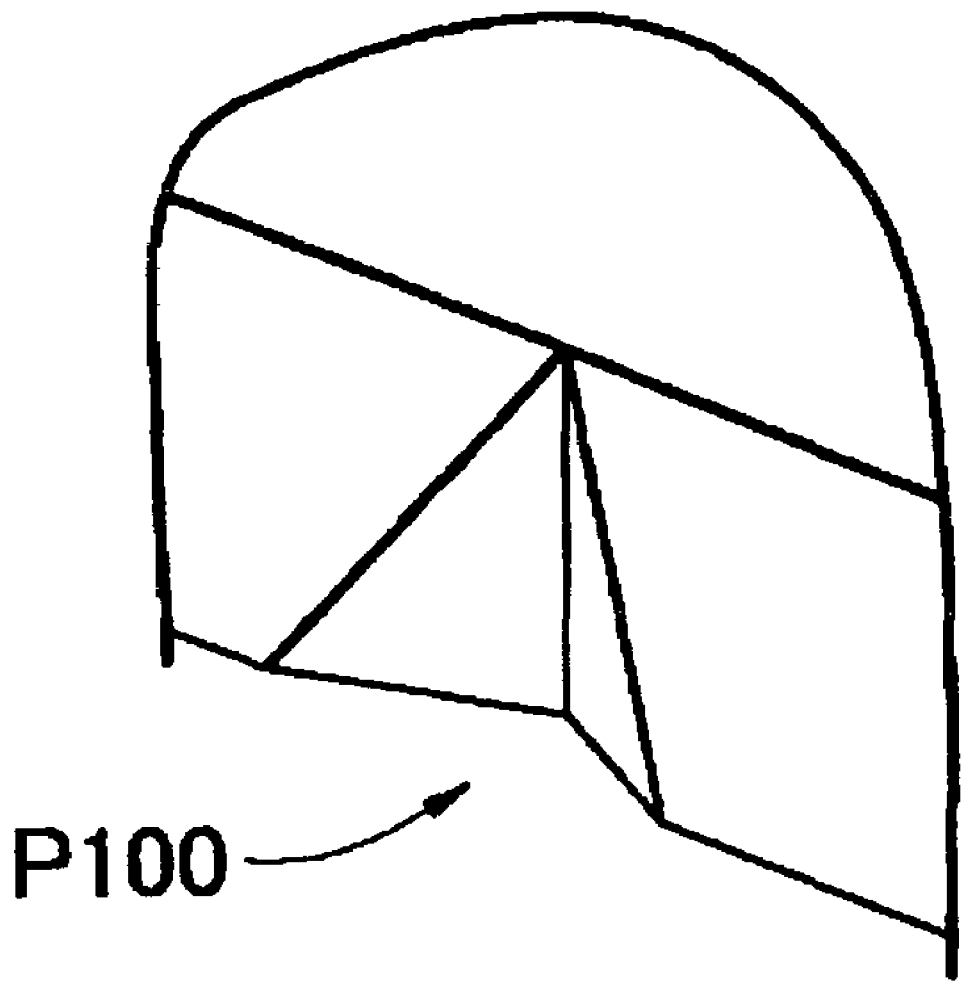
FIG. 7 is a schematic view showing a notched prism having a triangle pyramid shape comprising a part of the light introducing portion of a modified example according to the present invention.
Figure 8:
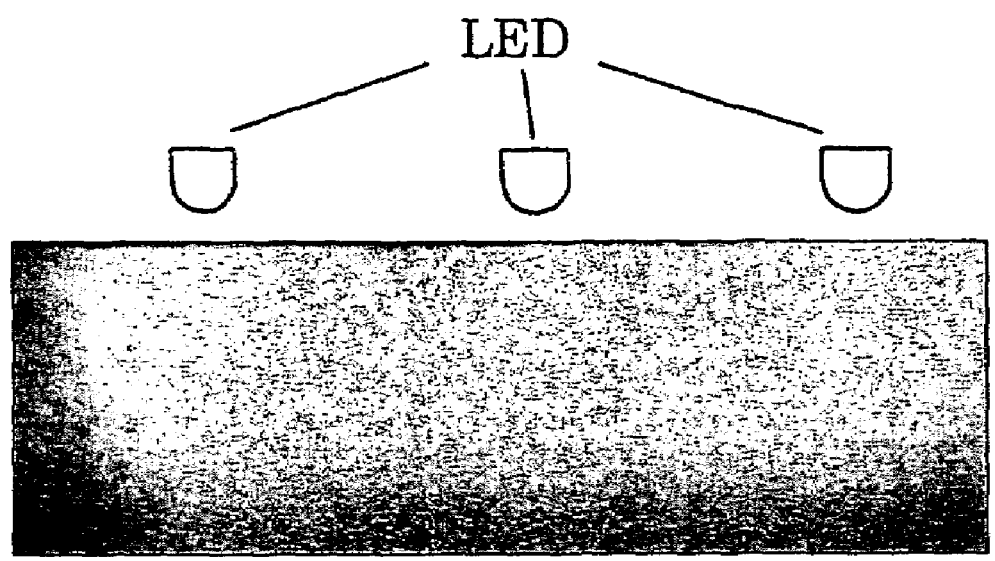
FIG. 8 is a picture showing the appearance of the emitting surface in the surface light emitting apparatus according to the present invention.
Figure 9:
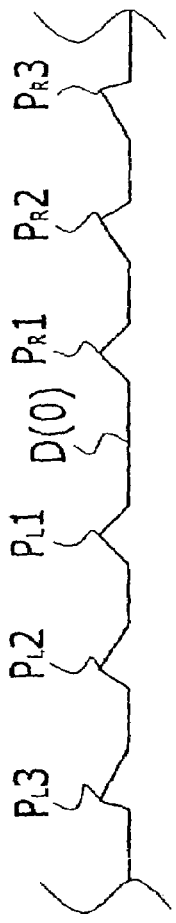
FIG. 9 is a schematic plan view showing the detailed light introducing portion of a further embodiment according to the present invention.

However, as shown in FIG. 7, the notched triangle pyramid does not penetrate to the main surface of the light emitting side. Consequently, light leaking from the main surface of the light emitting side can be reduced.

Accordingly, for example, this construction is suitable for a surface emitting apparatus having only a small space for forming the light introducing portion 12.

In addition, although a notched triangle pyramid is less effective for dispersing light emitted from the light source 2 in the lateral (right and left) directions than a notched triangle prism, a preferable light dispersion can be obtained by combining the notched triangle pyramid with the construction characteristics of the present invention so that the interval between adjacent prisms increases in proportion to the distance from the center of the light introducing portion 12.

In other words, the insufficient light dispersing effect of a notched triangle pyramid can be compensated for by the construction characteristics of the present invention.

The respective components of the various embodiments of the surface light emitting apparatus, including preferred materials, will be described below.

Optical Waveguide Plate 1

A material for the optical waveguide plate 1 of the present invention should have excellent properties in light transmission and in moldability. Materials such as an acrylate resin, a polycarbonate resin, a cycloolefin polymer, a polystyrene resin, a functional norbornene (norbornen-based) resin, and the like, can be used. Although the refractive indices of these materials vary, the light dispersion can be controlled by selecting the angles or the number of the notched prisms formed on the incident end face 3 of the optical waveguide plate 1, so that the use of these materials is not limited by the refractive index.

In addition the shape of the optical waveguide plate 1 can be choosen to be various shapes depending on the usage.

Light Source 2

In the surface light emitting apparatus of the present invention, the light source 2 can be either a single source or plural sources. Generally, a light emitting diode (LED element) is used. A support member, for example, made of a molded resin is used for placing and fixing the LED element and the notched prisms formed on the incident end face 3 of the optical waveguide plate 1. The LED element is disposed in such a way that the light emitting face of the LED element faces the light introducing portion 12 of the optical waveguide plate 1. The LED element comprises a semiconductor element and a light transmitting resin covers the semiconductor element. The light transmitting resin may contain a phosphor which absorbs the light emitted from the semiconductor element and emits light having a different wavelength from the absorbed light. In the case where the light emitted from the semiconductor element is an UV ray, a phosphor which is excited with the UV ray and emits an UV ray or visible light can be used. A semiconductor which is capable of emitting visible light can also be used. Furthermore, a phosphor which absorbs the visible light emitted from a semiconductor element and emits light having a longer wavelength can be used in combination with the semiconductor element. Light emission with mixed color having various tones can be realized by combining a semiconductor element and a phosphor. Moreover, color mixing can be improved by introducing light from the notched prisms as described above.

Semiconductor Element

As for a semiconductor element, for example, a element comprising a nitride compound semiconductor (general formula $In_iGa_jAl_kN$, $0 \leq i$, $0 \leq j$, $0 \leq k$, $i+j+k=1$) can be used. In addition, various nitride compound semiconductors can be used and these include compounds such as InGaN, and GaN doped with various impurities. The semiconductor element cited here is formed by growing the semiconductor, such as InGaN or GaN, as a light emitting layer onto a substrate by way of a MOCVD process and the like. As for the structure of the semiconductor element, a homostructure, or a heterostructure having a MIS junction, a PIN junction, or a P-N junction can be used. The emission wavelength of the nitride semiconductor layer can be selected in view of the materials or their degree of the mixed crystallinity. Also, the active layer of the semiconductor may be formed as a single quantum well structure or a multiple quantum well structure, that comprises a thin film having a quantum effect.

Fluorescent Material

The fluorescent material used in the present invention is for converting the wavelength of light emitted from an LED element. The wavelength of light emitted from the LED element which is deposited in the support body will be converted by the fluorescent material included in the light transmissive resin covering the LED element, so that light having a different color can be emitted from the support body. In the case where light emitted from the LED element is short-wavelength visible light having high energy, the following materials can be preferably used: a perylene derivative which is an organic fluorescent material, or ZnCdS:Cu, YAG:Ce, or nitrogen-contained $CaO—Al_2O_3—SiO_2$ activated with Eu and/or Cr which are inorganic fluorescent materials, or the like.

It is preferable that when YAG:Ce phosphor is used, blue light emitted from the LED element and its complementary yellowish light can be emitted by the phosphor which absorbs a portion of the blue light. According to the content of the phosphor, white light can also be created in a relatively easy way with good reliability. It is also preferable that when a nitrogen-containing $CaO—Al_2O_3—SiO_2$ phosphor activated with Eu and/or Cr is used, blue light emitted from the LED element and its complementary reddish light can be emitted by the phosphor which absorbs a portion of the blue light. Thus, according to the content of the phosphor, white light can also be created in a relatively easy way with good reliability.

In the embodiments described above, the number of notched prisms on the right and left sides of the light introducing portion 12 are set to be equal (n=m). However, the present invention is not limited to this combination and the numbers of notched prisms on the right and left sides of the notched prisms n, m, respectively, can be different (such as n≈m, or n≠m).

EXAMPLES

Next, the optical waveguide plate 1 of the surface emitting apparatus of the present invention will be described.

Example 1

The optical waveguide plate 1 shown in FIG. 1 is made as described in Example 1.

The optical waveguide plate 1 of Example 1 is set as follows. The end face of the incident side 11a and the opposite end face 11b are approximately 46 mm. The length of each of the side faces 11c and 11d is approximately 34 mm. An incident end face 3 protrudes approximately 3 mm outwardly from the incident side end face 11a. The width of the incident end face 3 is approximately 30 mm and the light introducing portions 12a, 12b, and 12c are formed on the incident end face 3.

In addition, each of the light introducing portions 12a, 12b, 12c comprises eleven notched triangle prisms P0, $P_L1$, $P_L2$, $P_L3$, $P_L4$, $P_L5$, $P_R1$, $P_R2$, $P_R3$, $P_R4$, and $P_R5$. These notched triangle prisms are isosceles triangles. The detailed configurations and the physical relationships thereof are shown in Tables 1 and 2.

TABLE 1

| notched prism | angle of inner incident face $\theta_{L(R)}$ i (k) | angle of outer incident face $\theta_{L(R)}$ o (k) |
|---|---|---|
| P0 | 30° (60°) | 30° (60°) |
| $P_L1$ | 36° (54°) | 24° (66°) |
| $P_L2$ | 42° (48°) | 18° (72°) |
| $P_L3$ | 48° (42°) | 12° (78°) |
| $P_L4$ | 54° (36°) | 6° (84°) |
| $P_L5$ | 60° (30°) | 0° (90°) |
| $P_R1$ | 36° (54°) | 24° (66°) |
| $P_R2$ | 42° (48°) | 18° (72°) |
| $P_R3$ | 48° (42°) | 12° (78°) |
| $P_R4$ | 54° (36°) | 6° (84°) |
| $P_R5$ | 60° (30°) | 0° (90°) |

In Table 1, an angle shown in parentheses ( ) is the angle with the incident end face 3.

TABLE 2

| (Interval of two adjacent notched prisms) | |
|---|---|
| $D_L$ (0, 1) | 0.11 mm |
| $D_L$ (1, 2) | 0.12 mm |
| $D_L$ (2, 3) | 0.16 mm |
| $D_L$ (3, 4) | 0.20 mm |
| $D_L$ (4, 5) | 0.24 mm |
| $D_R$ (0, 1) | 0.11 mm |
| $D_R$ (1, 2) | 0.12 mm |
| $D_R$ (2, 3) | 0.16 mm |
| $D_R$ (3, 4) | 0.20 mm |
| $D_R$ (4, 5) | 0.24 mm |

In addition, the width of the opening of the notched prism is set to be 0.1 mm, and the depth of the notched prism is set to be 0.095 mm.

Using the optical waveguide plate 1 for the surface light emitting apparatus of Example 1 described above, the light emitting diodes are deposited so as to face the light introducing portions 12a, 12b, and 12c, and the surface emitting apparatus is assembled. Then the appearance of the emission light on the light emitting surface 11 is observed.

In the present embodiment, a blast treatment is carried out on a portion of the reflective surface (a portion at a designated distance from the incident end face 3) of the optical waveguide plate 1 (a main surface facing the light emitting surface 11), which is close to the incident end face 3.

Example 2

Figure 10:
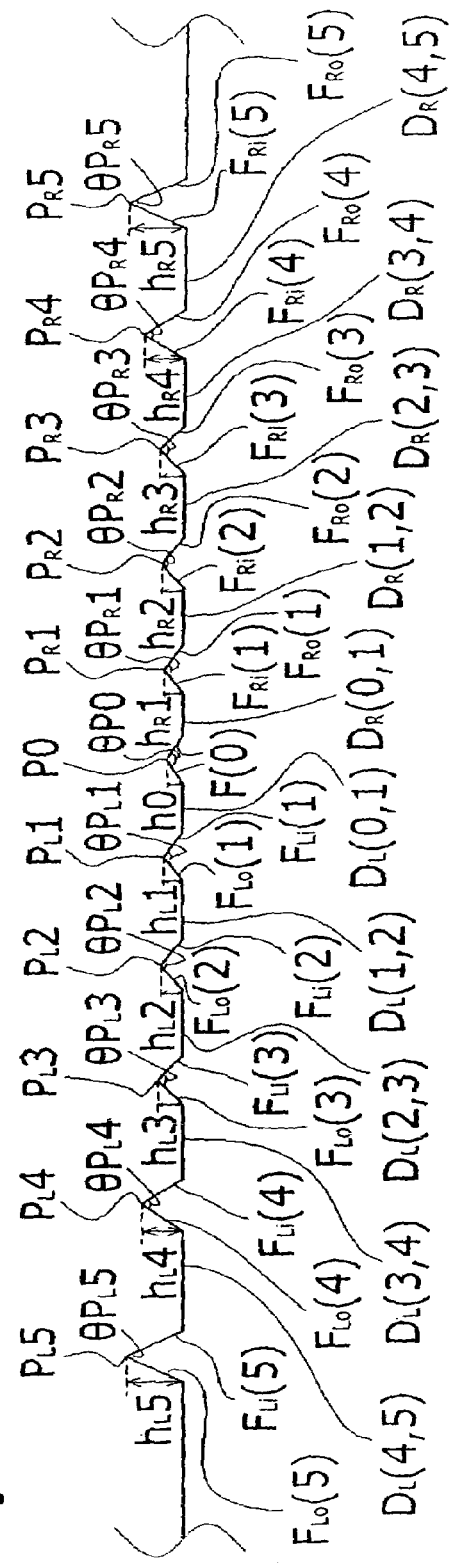
FIG. 10 is a schematic plan view showing the detailed light introducing portion of a still further embodiment according to the present invention.

The optical waveguide plate 1 of Example 2 is shown in FIG. 10.

The optical waveguide plate 1 of the present example disposed so that the end face of the incident side 11a and the opposite end face thereof 11b are approximately 46 mm. Also, the length of the side faces 11c and 11d are approximately 34 mm. Further, the length of the side faces 11c and 11d are approximately 34 mm. Also, the incident end face 3 protrudes approximately 3 mm outwardly from the incident side end face 11a. The width of the incident end face 3 is approximately 30 mm and the light introducing portions 12a, 12b, and 12c are formed on the incident end face 3.

In addition, each of the light introducing portions 12a, 12b, and 12c comprises eleven notched triangle prisms P0, $P_L1$, $P_L2$, $P_L3$, $P_L4$, $P_L5$, $P_R1$, $P_R2$, $P_R3$, $P_R4$, and $P_R5$. These notched triangle prisms are isosceles triangles. The detailed configurations and the physical relationships thereof are shown in Tables 3 and 4.

TABLE 3

| notched prism | apex angle $\theta$ made by the inner incident face and the outer incident face $\theta$ |
|---|---|
| P0 | 140° |
| $P_L1$ | 120° |
| $P_L2$ | 100° |
| $P_L3$ | 80° |
| $P_L4$ | 60° |
| $P_L5$ | 40° |
| $P_R1$ | 120° |
| $P_R2$ | 100° |
| $P_R3$ | 80° |
| $P_R4$ | 60° |
| $P_R5$ | 40° |

TABLE 4

| (Interval between two adjacent prisms) | |
|---|---|
| $D_L$ (0, 1) | 0.10 mm |
| $D_L$ (1, 2) | 0.14 mm |
| $D_L$ (2, 3) | 0.18 mm |
| $D_L$ (3, 4) | 0.22 mm |
| $D_L$ (4, 5) | 0.26 mm |
| $D_R$ (0, 1) | 0.10 mm |
| $D_R$ (1, 2) | 0.14 mm |
| $D_R$ (2, 3) | 0.18 mm |
| $D_R$ (3, 4) | 0.22 mm |
| $D_R$ (4, 5) | 0.26 mm |

In addition, the opening width of each notched prism including the central notched prism P0 is set to 0.10 mm.

By using the optical waveguide plate 1 for a surface emitting apparatus as described in Example 2 above, a shadowy portion formed in the vicinity of the end face of the incident side and the portions between the light sources 2 can be reduced.

Example 3

The optical waveguide plate 1 of Example 3 is shown in FIG. 14.

The optical waveguide plate 1 of the present example is set as in Example 1. The end face of the incident side 11a and the opposite end face thereof 11b are approximately 46 mm. The length of the side faces 11c and 11d are approximately 34 mm. The length of the side faces 11c and 11d are approximately 34 mm. Also, an incident end face 3 protrudes approximately 3 mm outwardly from the incident side end face 11a. The width of the incident end face 3 is approximately 30 mm and the light introducing portions 12a, 12b, and 12c are formed on the incident end face 3.

In addition, each of the light introducing portions 12a, 12b, and 12c comprises of nine notched triangle prisms P0, $P_L1$, $P_L2$, $P_L3$, $P_L4$, $P_R1$, $P_R2$, $P_R3$, and $P_R4$. These notched triangle prisms are isosceles triangles. The detailed configurations and the physical relationships thereof are shown in Tables 5 and 6.

TABLE 5

| notched prism | depth of a notched prism h | opening width w |
|---|---|---|
| P0 | 0.225 mm | 0.26 mm |
| $P_L1$ | 0.191 mm | 0.22 mm |
| $P_L2$ | 0.156 mm | 0.18 mm |
| $P_L3$ | 0.121 mm | 0.14 mm |
| $P_L4$ | 0.088 mm | 0.10 mm |
| $P_R1$ | 0.191 mm | 0.22 mm |
| $P_R2$ | 0.156 mm | 0.18 mm |
| $P_R3$ | 0.121 mm | 0.14 mm |
| $P_R4$ | 0.088 mm | 0.10 mm |

TABLE G (Interval between two adjacent prisms)

| | |
|---|---|
| $D_L$ (0, 1) | 0.22 mm |
| $D_L$ (1, 2) | 0.18 mm |
| $D_L$ (2, 3) | 0.14 mm |
| $D_L$ (3, 4) | 0.10 mm |
| $D_R$ (0, 1) | 0.22 mm |
| $D_R$ (1, 2) | 0.18 mm |
| $D_R$ (2, 3) | 0.14 mm |
| $D_R$ (3, 4) | 0.10 mm |

By using the optical waveguide plate 1 for a surface emitting apparatus as described in Example 3 above, the shadowy portion formed in the vicinity of the end face of the incident side and the portions between the light sources 2 can be reduced.

In the optical waveguide plate 1 for the surface light emitting apparatus of the present invention, the intervals between the prisms are set to become wider in proportion to the distance from the center of the light introducing portion 12. This allows incident light to be efficiently dispersed upon its introduction into the optical waveguide plate 1. Further, the shady portions formed in the vicinity of the incident end face 3 of the light emitting surface 11 can be minimized. Thus, the uniformity in surface light emission can be improved.

Consequently, a surface emitting apparatus capable of surface light emission with a high uniformity can be provided according to the present invention.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority application Nos. 2002-292294 filed on Oct. 4, 2002 and 2003-285382 filed on Aug. 1, 2003 are hereby incorporated by reference.

What is claimed is:

1. An optical waveguide plate for a surface light emitting apparatus comprising:
    an end face for introducing light emitted from a light source; and
    a light emitting surface outputting light introduced from said end face,
    wherein said end face includes a light introducing portion in front of a portion of the light source, and said light introducing portion comprising a plurality of single notched prisms which disperse incident light, each of said single notched prisms is a triangular prism, a center of the light source is disposed adjacent to and spaced from a center of said light introducing portion, and an interval between two adjacent distal notched prisms in said light introducing portion is greater than an interval between two adjacent proximal notched prisms in said light introducing portion.

2. The optical waveguide plate for a surface emitting apparatus according to claim 1, wherein said light introducing portion comprises said plurality of single notched prisms including a central notched prism disposed in a center of said light introducing portion;
    said plurality of single notched prisms, including said central notched prism, each include an apex angle, and each of said single notched prisms has the same apex angle as said central notched prism; and
    a height of each of said single notched prisms other than said central notched prism decreases as the distance from said central notched prism increases.

3. The optical waveguide plate for a surface emitting apparatus according to claim 1, wherein said plurality of single notched prisms includes a central notched prism disposed in a center of said light introducing portion;
    said plurality of single notched prisms, including said central notched prism, each include an apex angle, each of said single notched prisms has the same apex angle as said central notched prism; and
    a height of each of said single notched prisms other than said central notched prism increases as the distance from said central notched prism increases.

4. The optical waveguide plate for a surface emitting apparatus according to claim 1, wherein said plurality of single notched prisms includes a central notched prism disposed in a center of said light introducing portion;
    said plurality of single notched prisms, including said central notched prism, each include an apex angle, and each of said single notched prisms has the same apex angle as said central notched prism;
    a height of each of said single notched prisms other than said central notched prism increases as the distance from said central notched prism increase; and
    each of said single notched prisms includes an isosceles triangle.

5. The optical waveguide plate for a surface emitting apparatus according to claim 1, wherein said plurality of single notched prisms includes a central notched prism disposed in a center of said light introducing portion;

said central notched prism has a width; and
the width of said central notched prism and intervals between said central notched prism and said single notched prisms adjacent to said central notched prism are approximately equal in size.

6. The optical waveguide plate for a surface emitting apparatus according to claim 1, wherein said plurality of single notched prisms includes a central notched prism disposed in a center of said light introducing portion;
said central notched prism has a width; and
the width of said central notched prism is smaller than intervals between said central notched prism and said single notched prisms adjacent to said central notched prism.

7. An optical waveguide plate for a surface light emitting apparatus comprising:
an end face introducing light emitted from a light source;
a light emitting surface outputting light introduced from said end face; and
said end face including a light introducing portion in front of a portion of the light source, and said light introducing portion comprising a plurality of notched prisms including a flat portion disposed in a center of said light introducing portion, each of said notched prisms being a triangular prism, and a center of the light source being disposed adjacent to and spaced from a center of said light introducing portion,
wherein each of said notched prisms has an apex angle and the apex angles of each of said notched prisms disposed on one side of said flat portion are different than the apex angles of the other notched prisms on the one side of said flat portion.

8. The optical waveguide plate for a surface light emitting apparatus according to claim 7, wherein the apex angle of each of said notched prisms on one side of said flat portion equals the apex angle of a respective notched prism on another side of said flat portion.

9. The optical waveguide plate for a surface light emitting apparatus according to claim 7, wherein each of said plurality of notched prisms comprises an outer incident face on a side further from said flat portion and an inner incident face on a side closer to said flat portion; and
an apex angle made by said outer incident face and said inner incident face increases as the distance from said flat portion increases.

10. The optical waveguide plate for a surface light emitting apparatus according to claim 7, wherein a portion of said end face is disposed between two adjacent notched prisms so as to form an interval therebetween.

11. An optical waveguide plate for a surface light emitting apparatus comprising:
an end face for introducing light emitted from a light source;
a light emitting surface outputting light introduced from said end face; and
said end face including a light introducing portion in front of a portion of the light source, and said light introducing portion comprising a plurality of notched prisms including a central notched prism disposed in a center of said light introducing portion, each of said notched prisms being a triangular prism, and a center of the light source being disposed adjacent to and spaced from a center of said light introducing portion,
wherein said plurality of notched prisms, including said central notched prism, each include an apex angle, and each of said notched prisms has the same apex angle as said central notched prism, and a height of said plurality of notched prisms decreases as the distance from said central notched prism increases.

12. The optical waveguide plate for a surface light emitting apparatus according to claim 11, wherein said plurality of notched prisms are disposed in said light introducing portion and a portion of said end face is disposed between two adjacent notched prisms so as to form an interval therebetween.

13. The optical waveguide plate for a surface light emitting apparatus according to claim 11, wherein each of said notched prisms includes an isosceles triangle.

14. An optical waveguide plate for a surface light emitting apparatus comprising:
an end face for introducing light emitted from a light source;
a light emitting surface outputting light introduced from said end face;
said end face including a light introducing portion in front of a portion of the light source, and said light introducing portion comprising a plurality of notched prisms which disperse incident light, each of said notched prisms being a triangular prism, and a center of the light source being disposed adjacent to and spaced from a center of said light introduction portion; and
a flat portion being disposed in a center of said light introducing portion,
wherein said plurality of notched prisms each include an apex angle which is equal to the other apex angles, and a height of said plurality of notched prisms decreases as the distance from said flat portion increases.

15. The optical waveguide plate for a surface light emitting apparatus according to claim 14, wherein said plurality of notched prisms are disposed in said light introducing portion and a portion of said end face is disposed between two adjacent notched prisms so as to form an interval therebetween.

16. The optical waveguide plate for a surface light emitting apparatus according to claim 14, wherein each of said notched prisms includes an isosceles triangle.

17. A surface light emitting apparatus comprising:
a light source and an optical waveguide plate including an end face for introducing light emitted from said light source and a light emitting surface for outputting the light,
wherein said end face includes a light introducing portion in front of a portion of said light source, and said light introducing portion comprising a plurality of notched prisms which diffuse incident light, each of said notched prisms is a triangular prism, a center of said light source is disposed adjacent to and spaced from a center of said light introducing portion, and an interval between two adjacent distal notched prisms in said light introducing portion is greater than an interval between two adjacent proximal notched prisms in said light introducing portion, and said notched prisms are triangular pyramids in said end face.

18. The surface light emitting apparatus according to claim 17, wherein said light source is a light emitting diode.

19. A surface light emitting apparatus comprising:
a plurality of light sources and an optical waveguide plate including an end face for introducing light emitted from said plurality of light sources and a light emitting surface for outputting the light; and
said end face including a plurality of light introducing portions in front of each of a portion of each of said light sources, and each of said light introducing portions comprising a plurality of notched prisms including a flat portion disposed in a center of said light introducing portion, and a center of each of said light sources being disposed adjacent to and spaced from a respective center of said respective light introducing portion, wherein each of said notched prisms has an apex angle and the apex angles of each of said notched prisms disposed on the one side of said flat portion are different than the apex angles of the other notched prisms on the one side of said flat portion.

20. The surface light emitting apparatus according to claim 19, wherein the apex angle of each of said notched prisms on one side of said flat portion equals the apex angle of a respective single notched prism on another side of said flat portion.

21. The surface light emitting apparatus according to claim 19, wherein said light source is a light emitting diode.

* * * * *